US012058625B2

(12) United States Patent
Chen et al.

(10) Patent No.: US 12,058,625 B2
(45) Date of Patent: *Aug. 6, 2024

(54) REPORTING POWER HEADROOM IN MULTIPLE CONNECTIVITY NEXT GENERATION NETWORKS

(71) Applicant: 5G IP Holdings LLC, Dallas, TX (US)

(72) Inventors: Hung-Chen Chen, Taipei (TW); Chie-Ming Chou, Taipei (TW)

(73) Assignee: 5G IP Holdings LLC

( * ) Notice: Subject to any disclaimer, the term of this patent is extended or adjusted under 35 U.S.C. 154(b) by 463 days.

This patent is subject to a terminal disclaimer.

(21) Appl. No.: 17/526,315

(22) Filed: Nov. 15, 2021

(65) Prior Publication Data

US 2022/0078724 A1 Mar. 10, 2022

Related U.S. Application Data

(63) Continuation of application No. 17/149,011, filed on Jan. 14, 2021, now Pat. No. 11,197,250, which is a continuation of application No. 16/657,986, filed on Oct. 18, 2019, now abandoned, which is a continuation of application No. 16/252,085, filed on Jan. 18, 2019, now Pat. No. 10,492,153.

(Continued)

(51) Int. Cl.
*H04W 52/36* (2009.01)
*H04L 1/1607* (2023.01)
*H04W 24/10* (2009.01)
*H04W 76/15* (2018.01)

(52) U.S. Cl.
CPC ......... *H04W 52/365* (2013.01); *H04L 1/1614* (2013.01); *H04W 24/10* (2013.01); *H04W 76/15* (2018.02)

(58) Field of Classification Search
CPC ... H04W 76/15; H04W 24/10; H04W 52/365; H04L 1/1614
See application file for complete search history.

(56) References Cited

U.S. PATENT DOCUMENTS

2015/0085760 A1* 3/2015 Yamada ................ H04W 24/10
370/329
2016/0066233 A1* 3/2016 Balachandran ....... H04W 76/16
370/331

(Continued)

FOREIGN PATENT DOCUMENTS

CN 105338611 A 2/2016
CN 105393610 A 3/2016

(Continued)

*Primary Examiner* — Raymond S Dean
(74) *Attorney, Agent, or Firm* — ScienBiziP, P.C.

(57) ABSTRACT

A method by a base station for receiving power headroom reporting from a user equipment (UE) in a Multi-Radio Access Technology (RAT)-Dual Connectivity (MR-DC) scenario, the method includes receiving a DC Power Headroom Report (PHR) Medium Access Control (MAC) Control Element (CE) from the UE, the DC PHR MAC CE having a fixed number of octets with cell index fields for indicating whether a power headroom (PH) for a serving cell with a corresponding cell index is reported, wherein the fixed number of octets is independent of a highest secondary Cell Index (SCellIndex) for serving cells with configured uplinks.

16 Claims, 23 Drawing Sheets

Related U.S. Application Data

(60) Provisional application No. 62/618,691, filed on Jan. 18, 2018.

(56) References Cited

U.S. PATENT DOCUMENTS

| | | | |
|---|---|---|---|
| 2016/0150485 A1* | 5/2016 | Yi | H04W 52/34 |
| | | | 370/311 |
| 2019/0053170 A1* | 2/2019 | Lee | H04W 72/23 |
| 2019/0141571 A1* | 5/2019 | Kim | H04L 69/04 |
| 2019/0141742 A1* | 5/2019 | Zhou | H04L 5/0064 |
| 2019/0182870 A1* | 6/2019 | Shih | H04W 16/32 |

FOREIGN PATENT DOCUMENTS

| | | |
|---|---|---|
| CN | 105592539 A | 5/2016 |
| CN | 105830507 A | 8/2016 |
| CN | 106165476 A | 11/2016 |
| WO | 2014085984 A1 | 6/2014 |
| WO | 2015093768 A1 | 6/2015 |
| WO | 2016168342 A1 | 10/2016 |
| WO | 2016183714 A1 | 11/2016 |

* cited by examiner

102

| C7 | C6 | C5 | C4 | C3 | C2 | C1 | R |
|----|----|----|----|----|----|----|---|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |

120

| P | V | PH (Type 2, PCell) |
|---|---|---|
| R | R | $P_{CMAX,c}$ 1 |
| P | V | PH (Type 2, PSCell) |
| R | R | $P_{CMAX,c}$ 2 |
| P | V | PH (Type 1, PCell) |
| R | R | $P_{CMAX,c}$ 3 |
| P | V | PH (Type x, Serving Cell 1) |
| R | R | $P_{CMAX,c}$ 4 |

• • •

| P | V | PH (Type x, Serving Cell n) |
|---|---|---|
| R | R | $P_{CMAX,c}$ m |

FIG. 1B

| C7 | C6 | C5 | C4 | C3 | C2 | C1 | R |
|---|---|---|---|---|---|---|---|
| P | V | \multicolumn{5}{c}{PH (Type 2, SpCell of the other MAC entity)} | |
| R1 | R2 | \multicolumn{6}{c}{$P_{CMAX,c}$ 1} |
| P | V | \multicolumn{6}{c}{PH (Type 1, PCell)} |
| R1 | R2 | \multicolumn{6}{c}{$P_{CMAX,c}$ 2} |
| P | V | \multicolumn{6}{c}{PH (Type x, Serving Cell 1 OUL)} |
| R1 | R2 | \multicolumn{6}{c}{$P_{CMAX,c}$ 3} |

· · ·

| P | V | PH (Type x, Serving Cell n OUL) |
|---|---|---|
| R1 | R2 | $P_{CMAX,c}$ m |

| C7 | C6 | C5 | C4 | C3 | C2 | C1 | R |
|----|----|----|----|----|----|----|---|
| P | V | PH (Type 2, SpCell of the other MAC entity) ||||||
| R1 | R2 | $P_{CMAX,c}$ 1 ||||||
| P | V | PH (Type 1, PCell) ||||||
| R1 | R2 | $P_{CMAX,c}$ 2 ||||||
| P | V | PH (Type x, Serving Cell 1 OUL) — 730 ||||||
| R1 ← 712 | R2 ← 713 | $P_{CMAX,c}$ 3 ||||||
| P | V | PH (Type x, Serving Cell 1 SUL) — 740 ||||||
| R3 ← 715 | R3 | $P_{CMAX,c}$ 4 ||||||

· · ·

| P | V | PH (Type x, Serving Cell n OUL) |
| R1 | R2 | $P_{CMAX,c}$ m |

FIG. 7

| C7 | C6 | C5 | C4 | C3 | C2 | C1 | R |
|---|---|---|---|---|---|---|---|
| P | V | \multicolumn{6}{l}{PH (Type 2, SpCell of the other MAC entity)} | | | | | |
| R1 | R2 | $P_{CMAX,c}$ 1 | | | | | |
| P | V | PH (Type 1, PCell) | | | | | |
| R1 | R2 | $P_{CMAX,c}$ 2 | | | | | |
| P | V | PH (Type x, Serving Cell 1 OUL) | | | | | |
| R1 | R2 | $P_{CMAX,c}$ 3 | | | | | |
| P | V | PH (Type x, Serving Cell 2 SUL) | | | | | |
| R1 | R2 | $P_{CMAX,c}$ 4 | | | | | |
| P | V | PH (Type x, Serving Cell 3 OUL) | | | | | |
| R1 | R2 | $P_{CMAX,c}$ 5 | | | | | |
| P | V | PH (Type x, Serving Cell 3 SUL) | | | | | |
| R3 | R3 | $P_{CMAX,c}$ 6 | | | | | |
| ... | | | | | | | |
| P | V | PH (Type x, Serving Cell n OUL) | | | | | |
| R1 | R2 | $P_{CMAX,c}$ m | | | | | |

Annotations: 900; 910 → PH (Type x, Serving Cell 1 OUL); R1=0 → row with $P_{CMAX,c}$ 3; 920 → PH (Type x, Serving Cell 2 SUL); R1=0 → row with $P_{CMAX,c}$ 4; 930 → PH (Type x, Serving Cell 3 OUL); R1=1 → row with $P_{CMAX,c}$ 5; 940 → PH (Type x, Serving Cell 3 SUL); 950 → row with $P_{CMAX,c}$ 6

FIG. 9

| C7 | C6 | C5 | C4 | C3 | C2 | C1 | R |
|---|---|---|---|---|---|---|---|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
| P | V | PH (Type 2, SpCell of the other MAC entity) ||||||
| R1 | R2 | $P_{CMAX,c}$ 1 ||||||
| P | V | PH (Type 1, PCell) ||||||
| R1 | R2 | $P_{CMAX,c}$ 2 ||||||
| P | V | PH (Type x, Serving Cell 1 OUL) ||||||
| R1 | R2 | $P_{CMAX,c}$ 3 ||||||
R1=0 
· · ·
| P | V | PH (Type x, Serving Cell n OUL) ||||||
| R1 | R2 | $P_{CMAX,c}$ m ||||||
FIG. 10

1100

| C7 | C6 | C5 | C4 | C3 | C2 | C1 | R |
|----|----|----|----|----|----|----|----|
| C15 | C14 | C13 | C12 | C11 | C10 | C9 | C8 |
| C23 | C22 | C21 | C20 | C19 | C18 | C17 | C16 |
| C31 | C30 | C29 | C28 | C27 | C26 | C25 | C24 |
| P | V | \multicolumn{6}{c}{PH (Type 2, SpCell of the other MAC entity)} |
| R1 | R2 | \multicolumn{6}{c}{$P_{CMAX,c}$ 1} |
| P | V | \multicolumn{6}{c}{PH (Type 1, PCell)} |
| R1 | R2 | \multicolumn{6}{c}{$P_{CMAX,c}$ 2} |
| P | V | \multicolumn{6}{c}{PH (Type x, Serving Cell 1 OUL)} |
| R1 | R2 | \multicolumn{6}{c}{$P_{CMAX,c}$ 3} |
| P | V | \multicolumn{6}{c}{PH (Type x, Serving Cell 1 SUL)} |
| R3 | R3 | \multicolumn{6}{c}{$P_{CMAX,c}$ 4} |
| P | V | \multicolumn{6}{c}{PH (Type x, Serving Cell n OUL)} |
| R1 | R2 | \multicolumn{6}{c}{$P_{CMAX,c}$ m} |

- 1120 → PH (Type x, Serving Cell 1 OUL) row
- R1=1 → R1 of row with $P_{CMAX,c}$ 3
- 1130 → PH (Type x, Serving Cell 1 SUL) row
- 1140 → R3 R3 / $P_{CMAX,c}$ 4 row

FIG. 11

| C7 | C6 | C5 | C4 | C3 | C2 | C1 | R | |
|---|---|---|---|---|---|---|---|---|
| P | V | \multicolumn{6}{c}{PH (Type 2, SpCell of the other MAC entity)} | | ~1320 |
| R1 | R2 | \multicolumn{6}{c}{$P_{CMAX,c}$ 1} | | |
| P | V | \multicolumn{6}{c}{PH (Type x, Serving Cell 1 OUL)} | | ~1310 |
| R1 | R2 | \multicolumn{6}{c}{$P_{CMAX,c}$ 2} | | |

R1=0

• • •

| P | V | PH (Type x, Serving Cell n OUL) |
| R1 | R2 | $P_{CMAX,c}$ m |

1400

| C7 | C6 | C5 | C4 | C3 | C2 | C1 | R |
|---|---|---|---|---|---|---|---|
| P | V | \multicolumn{5}{c}{PH (Type 2, SpCell of the other MAC entity)} | |
| R1 | R2 | \multicolumn{5}{c}{$P_{CMAX,c}$ 1} | |
| P | V | \multicolumn{5}{c}{PH (Type x, Serving Cell 1 OUL)} | |
| R1 | R2 | \multicolumn{5}{c}{$P_{CMAX,c}$ 2} | |
| P | V | \multicolumn{5}{c}{PH (Type x, Serving Cell 1 SUL)} | |
| R3 | R3 | \multicolumn{5}{c}{$P_{CMAX,c}$ 3} | |

Row annotations: row with "PH (Type x, Serving Cell 1 OUL)" labeled 1410; row with "PH (Type x, Serving Cell 1 SUL)" labeled 1420; the R1 in the row "R1 R2 $P_{CMAX,c}$ 2" labeled R1=1; the R3/R3 row labeled 1430.

| C7 | C6 | C5 | C4 | C3 | C2 | C1 | R |
|---|---|---|---|---|---|---|---|
| P | V | \multicolumn{5}{c}{PH (Type x, Serving Cell n OUL)} | |
| R1 | R2 | \multicolumn{5}{c}{$P_{CMAX,c}$ m} | |

FIG. 14

| C7 | C6 | C5 | C4 | C3 | C2 | C1 | R |
|----|----|----|----|----|----|----|---|
| P | V | \multicolumn{5}{l}{PH (Type 2, SpCell of the other MAC entity)} | | | | | |
| R1 | R2 | \multicolumn{5}{l}{$P_{CMAX,c}$ 1} | | | | | |
| P | V | \multicolumn{5}{l}{PH (Type 1, PCell)} | | | | | |
| R1 | R2 | \multicolumn{5}{l}{$P_{CMAX,c}$ 2} | | | | | |
| P | V | \multicolumn{5}{l}{PH (Type x, Serving Cell 1 OUL)} | | | | | |
| R1 | R2 | \multicolumn{5}{l}{$P_{CMAX,c}$ 3} | | | | | |
| P | V | \multicolumn{5}{l}{PH (Type x, Serving Cell 2 OUL)} | | | | | |
| R1 | R2 | \multicolumn{5}{l}{$P_{CMAX,c}$ 4} | | | | | |

...

| P | V | PH (Type x, Serving Cell n OUL) |
| R1 | R2 | $P_{CMAX,c}$ m |

| C7 | C6 | C5 | C4 | C3 | C2 | C1 | R |
|----|----|----|----|----|----|----|---|
| P | V | \multicolumn{5}{c}{PH (Type 2, SpCell of the other MAC entity)} | | | | | |
| R1 | R2 | \multicolumn{5}{c}{$P_{CMAX,c}$ 1} | | | | | |
| P | V | \multicolumn{5}{c}{PH (Type 1, PCell)} | | | | | |
| R1 | R2 | \multicolumn{5}{c}{$P_{CMAX,c}$ 2} | | | | | |
| P | V | \multicolumn{5}{c}{PH (Type x, Serving Cell 1 SUL)} | | | | | |
| R1 | R2 | \multicolumn{5}{c}{$P_{CMAX,c}$ 3} | | | | | |
| P | V | \multicolumn{5}{c}{PH (Type x, Serving Cell 2 SUL)} | | | | | |
| R3 | R3 | \multicolumn{5}{c}{$P_{CMAX,c}$ 4} | | | | | |

• • •

| P | V | PH (Type x, Serving Cell n SUL) |
| R1 | R2 | $P_{CMAX,c}$ m |

| C7 | C6 | C5 | C4 | C3 | C2 | C1 | R |
|---|---|---|---|---|---|---|---|
| P | V | \multicolumn{6}{l|}{PH (Type 2, SpCell of the other MAC entity)} | |
| R1 | R2 | \multicolumn{6}{l|}{$P_{CMAX,c}$ 1} | |
| P | V | \multicolumn{6}{l|}{PH (Type 1, PCell)} | |
| R1 | R2 | \multicolumn{6}{l|}{$P_{CMAX,c}$ 2} | |
| P | V | \multicolumn{6}{l|}{PH (Type x, Serving Cell 1 OUL)} | |
| R1 | R2 | \multicolumn{6}{l|}{$P_{CMAX,c}$ 3} | |
| P | V | \multicolumn{6}{l|}{PH (Type x, Serving Cell 1 SUL)} | |
| R3 | R3 | \multicolumn{6}{l|}{$P_{CMAX,c}$ 4} | |

...

| P | V | PH (Type x, Serving Cell n OUL) |
|---|---|---|
| R1 | R2 | $P_{CMAX,c}$ m |

REPORTING POWER HEADROOM IN MULTIPLE CONNECTIVITY NEXT GENERATION NETWORKS

CROSS REFERENCE TO RELATED APPLICATION(S)

This application is a continuation of U.S. patent application Ser. No. 17/149,011, filed on Jan. 14, 2021, which is a continuation of U.S. patent application Ser. No. 16/657,986, filed on Oct. 18, 2019, entitled "Reporting Power Headroom in Multiple Connectivity Next Generation Networks," which is a continuation of U.S. patent application Ser. No. 16/252,085, filed on Jan. 18, 2019, entitled "Reporting Power Headroom in Multiple Connectivity Next Generation Networks," which claims the benefit of and priority to U.S. Provisional Patent Application Ser. No. 62/618,691, filed on Jan. 18, 2018, entitled "Advanced Multiple Entry PHR MAC CE Design," the contents of all which are hereby fully incorporated herein by reference for all purposes.

FIELD

The present disclosure generally relates to wireless communication methods, and more particularly, reporting power headroom in a Multi-Radio Access Technology (RAT)-Dual Connectivity (MR-DC) scenario and MR-Multiple Connectivity (MR-MC) scenario.

BACKGROUND

In a wireless communication system, a UE's Power Headroom Report (PHR) provides the UE's power information to a base station for the base station to schedule, for example, an appropriate uplink resources and modulation and/or coding scheme for an uplink transmission by the UE. Conventionally, there is only one serving base station for a UE, such that the UE may only need to send the PHR of the active serving cells to the base station. When two or more links are supported, the UE may need to send PHRs to two or more serving base stations.

For example, in a long term evolution (LTE) Dual Connectivity (DC) scenario, power headroom of all active serving cells with configured uplink should be reported in a PHR Medium Access Control (MAC) Control Element (CE) field to the serving base stations. In order to avoid waste of resources, a base station (e.g., an evolved NodeB (eNB)) involved in the LTE DC scenario should know the power limitation of the corresponding UE. Specifically, to assist the eNB to schedule the uplink transmission resources for the UE in an appropriate way, the UE may need to be able to report its available power headroom to the eNB. The eNB may then use the received power headroom report to determine how much more uplink bandwidth (e.g., per subframe) the UE is capable of using.

In a next generation (e.g., $5^{th}$ Generation New Radio (5G NR) wireless communication network, similar principles may apply for the same purpose (e.g., for an eNB and a next generation nodeB(gNB) to negotiate the maximum allowed power values for LTE (P_LTE) and NR (P_NR)). However, whether and/or how one Radio Access Technology (RAT) (e.g., LTE) is able to know about or understand the PHR of another RAT (e.g., NR) has not been extensively discussed. In addition, in order to reuse the Dual Connectivity PHR MAC CE for an Evolved-Universal Terrestrial Radio Access (UTRAN) Network New Radio-Dual Connectivity (EN-DC) scenario, there is no particular method of reporting a supplemental uplink (SUL), that is associated with a serving cell, without significantly changing the existing PHR MAC CE structure, which is designed based on a per cell basis, and not a per uplink carrier basis. The existing PHR MAC CE structure, which supports at most 32 serving cells, makes it difficult for EN-DC and a Multiple Entry (ME) PHR MAC CE, to consider supporting a SUL carrier for all serving cells, especially when a master eNB (MeNB) and a secondary gNB (SgNB) are not aware of each other's configurations. Specifically, a master eNB (MeNB) may not know which serving cell in a secondary cell group (SCG) is configured with a SUL.

In NR, the PH field may have 6 bits, similar to the LTE PH field. That is, NR may support a PHR format including a bitmap, a type 2 PH field for the Special Cell (SpCell) of the other MAC entity, a type 1 PH field for the Primary Cell (PCell), and one or more type X PH fields for the serving cells in an ascending order according to the Serving Cell Index (ServCellIndex), where X is either 1 or 3 based on the configurations or predefined rules. It should be noted that in a Dual Connectivity operation, the term Special Cell (SpCell) refers to the PCell of the MCG or the PSCell of the SCG, otherwise the term Special Cell refers to the PCell. In an MR-DC (e.g., in an EN-DC) case, the master node (MN) provides the secondary node (SN) with the range of Cell Index (SCellIndex or ServCellIndex) to be used by signaling a start value and a stop value if cell index range for 32 cells is used between the MN and the SN. The UE may use Dual Connectivity PHR MAC CE supporting up to 32 serving cells with configured uplink for the PH reporting to eNB. On the other hand, the UE may use Multiple Entry (ME) PHR MAC CE supporting up to 32 serving cells with configured uplink for the PH reporting to gNB.

In addition, in the LTE-NR scenario discussed above, SULs may be used in NR. The SUL carriers may help resolve potential uplink coverage issues. For example, when a UE initiates an initial access while camping on an SUL-capable cell, an SUL carrier selection operation is performed based on a threshold configured in the Remaining Minimum System Information (RMSI). This allows the UE to select the SUL carrier if, and only if, the Received Signal Strength Indicator (RSRP) on the Downlink (DL) carrier is not satisfied compared to the threshold in order to enable the Random Access (RA) procedure by the assistance of the SUL carrier.

Moreover, for a contention based RA procedure, if the network does not explicitly tell the UE which carrier to use, the UE may perform an Uplink (UL) selection based on the RSRP threshold as an initial access. In an EN-DC case, the Master Cell Group (MCG) carriers include LTE frequencies for both UL and DL. Therefore, there is no use case for the MCG to configure the SUL. For the EN-DC Secondary Cell group (SCG), however, it is yet to be determined whether the SUL carrier is used for the PSCell only, or for all serving cells (including the PSCell) of the NR SCG. Using the SUL for the contention-free Random Access Channel (RACH) procedure in a serving cell may also improve the successful rate of Contention-Free Random Access (CFRA) in the serving cell.

SUMMARY

The present disclosure is directed to reporting power headroom in Multi-Radio Access Technology (RAT)-Dual Connectivity (MR-DC) scenario and MR-Multiple Connectivity (MR-MC) scenario.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 1B illustrates a Dual Connectivity PHR MAC Control Element structure when the highest number of the serving cells with configured uplink is more than, or equal to, eight serving cells (i.e., the highest SCellIndex of SCell with configured uplink is equal to or more than 8), according to an exemplary implementation of the present application.

FIG. 6 illustrates a PHR MAC CE that is configured to show that a serving cell is not associated with an SUL, according to an exemplary implementation of the present application.

FIG. 7 illustrates a PHR MAC CE that is configured to indicate the presence of a PH of an SUL associated with a serving cell, according to an exemplary implementation of the present application.

FIG. 9 illustrates an example of including the values of the PH and the PCMAX,c associated with the PH in an PHR MAC CE, according to an example implementation of the present application.

FIG. 10 illustrates a ME PHR MAC configured to indicate that the PH of an SUL associated with a serving cell is not present, according to an exemplary implementation of the present application.

FIG. 11 illustrates a ME PHR MAC configured to indicate that the PH of an SUL associated with a serving cell is present, according to an exemplary implementation of the present application.

FIG. 14 illustrates a PHR MAC CE with a configured SUL for a serving cell and removed PCell fields, according to an exemplary implementation of the present application.

DETAILED DESCRIPTION

Figure 1A:
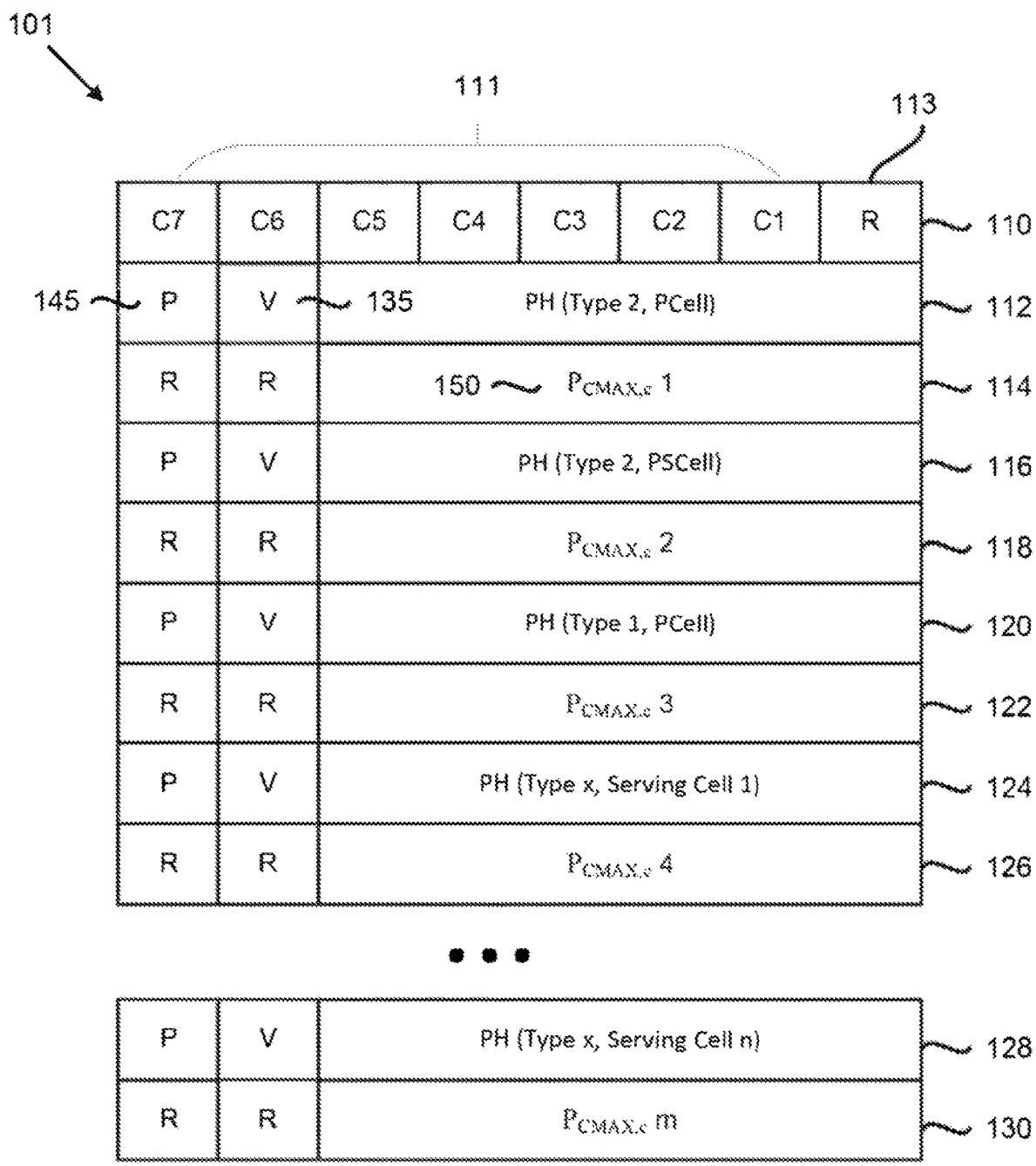
FIG. 1A illustrates a Dual Connectivity PHR MAC Control Element structure when the highest number of the serving cells with configured uplink is less than eight serving cells (i.e., the highest SCellIndex of SCell with configured uplink is less than 8), according to an exemplary implementation of the present application.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long-term evolution (LTE) system, an LTE-Advanced (LTE-A) system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), or an internet), through a radio access network (RAN) established by the base station.

It should be noted that, in the present application, a UE may include, but is not limited to, a mobile station, a mobile terminal or device, a user communication radio terminal, etc. For example, a UE may be a portable radio equipment, which includes, but is not limited to, a mobile phone, a tablet, a wearable device, a sensor, or a personal digital assistant (PDA) having wireless communication capability, etc. The UE is configured to receive/transmit signals over an air interface from/to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-AN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GPRS), Universal Mobile Telecommunication System (UMTS, often referred to as 3G based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station may communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it should be noted that in a transmission time interval TX of a single NR frame, at least downlink (DL) transmission data, a guard period, and uplink (UL) transmission data should be included. Additionally, the respective portions of the DL transmission data, the guard period, and the UL transmission data should also be configurable, for example, based on the network dynamics of NR. In addition, sidelink resource may also be provided in an NR frame to support ProSe services.

In LTE Dual Connectivity (DC), for a Pathloss change, a Power Management Maximum Power Reduction (P-MPR) change, and/or a Serving Cell activation that triggers power headroom reporting, both UE Medium Access Control (MAC) entities (e.g., the MAC entity for the master cell group (MCG) and the MAC entity for the secondary cell group (SCG)) may trigger the PHR. On the other hand, for reconfiguration of the power headroom reporting functionality by upper layers, only the corresponding UE MAC entity may trigger the PHR. It should be noted that the power headroom of all of the serving cells (e.g., that are activated by the network with configured uplink) should be reported in an ME PHR MAC control element field (e.g., in the DC PHR MAC CE or ME PHR MAC CE).

The DC PHR MAC CE is introduced in section 6.1.3.6 of the Technical Specification (TS) 36.331 (version 13.1.0 Release 13) of the 3rd Generation Partnership Project (3GPP). The content of 3GPP TS36.331 is hereby incorporated by reference in its entirety. The DC PHR MAC CE is identified in the section by a MAC Protocol Data Unit (PDU) subheader with Logical Channel Identifier (LCID), as specified in table 6.2.1-2 of the TS 36.321. The DC PHR MAC CE has a variable size and is described in Figure 6.1.3.6b-1 and Figure 6.1.3.6b-2 of the TS 36,321, as shown in FIGS. 1A and 1B.

FIG. 1A illustrates a Dual Connectivity PHR MAC Control Element structure 101 when the highest number of the serving cells with configured uplink is less than eight serving cells (i.e., the highest SCellIndex of SCell with configured uplink is less than 8), according to an exemplary implementation of the present application. FIG. 1B illustrates a Dual Connectivity PHR MAC Control Element structure 102 when the highest number of the serving cells with configured uplink is more than, or equal to, eight serving cells (i.e., the highest SCeollIndex of SCell with configured uplink is equal to or more than 8), according to an exemplary implementation of the present application. As shown in FIG. 1A, in the DC PHR MAC CE structure, one octet 110 with Ci fields 111 is used when the highest SCellIndex of serving cells with configured uplink is less than 8, otherwise, as shown in FIG. 1B, four octets 120 with Ci fields are used. Each one of the Ci fields 111, as described below, indicates the presence of power headroom for the associated serving cell (that is activated). It should be noted that the Ci fields are used for indicating the presence of the PH per serving cell other than the PCell.

FIGS. 1A-1B also show that when Type 2 PH is reported for the Primary Cell (PCell), the octet 112 containing the Type 2 PH field is included in the DC PHR MAC CE first after the octet(s) indicating the presence of PH per cell (e.g., the PSCell and all of the serving cells of all MAC entities). The Type 2 PCell octet 112 is followed by an octet 114 containing the associated PCMAX,c field (if reported). It should be noted that a Type 2 PH field indicates the PH when both Physical Uplink Control Channel (PUCCH) and Physical Uplink Shared Channel (PUSCH) are present.

With further reference to FIGS. 1A-1B, after the Type 2 PH field 112 for the PCell and its associated PCMAX,c field 114, when a Type 2 PH is reported for the PSCell, there is an octet 116 containing the Type 2 PH field, followed by an octet 118 containing the associated PCMAX,c field (if reported). Then follows an octet 120 with the Type 1 PH field and an octet 122 with the associated PCMAX,c field (if reported) for the PCell. It should be noted that the Type 1 PH field only takes the PUSCH transmission power into account. The rest of the fields in the DC PHR MAC CE, as shown (e.g., octets 124-126), follow in an ascending order based on the ServCellIndex (which is configured by an upper layer) up to the octet 128 with the Type x PH field, where x is equal to 3 when the ul-Configuration-r14 is configured for the corresponding serving cell, or otherwise x is equal to 1. As shown in FIGS. 1A-1B, an octet (such as any of the octets 114, 118, 122, 126, and 130) with the associated PCMAX,c field (if reported) for the serving cells of all MAC entities are included in the structure of the DC PHR MAC CEs 101 and 102.

With continued reference to FIGS. 1A-1B, each element used in the definition of the DC PHR MAC CEs 101 and 102 is now described. The "Ci" field 111 indicates the presence of a PH field for the serving cell of any MAC entity, except the PCell, with ServCellIndex or SCellIndex i as specified in the TS 36.331, the content of which is hereby incorporated by reference in its entirety. A Ci field 111 set to "1" may indicate that a PH field for the serving cell with ServCellIndex or SCellIndex i is reported. Alternatively, a Ci field 111 set to "0" may indicate that a PH field for the serving cell with ServCellIndex or SCellIndex i is not reported. The "R" field 113 is a reserved bit and by default is set to "0". The "V" field 135 may indicate whether the PH value is based on a real transmission or a reference format.

For a Type 1 PH, V=0 indicates a real transmission on PUSCH and V=1 indicates that a PUSCH reference format is used. For a Type 2 PH, V=0 indicates a real transmission on PUCCH and V=1 indicates that a PUCCH reference format is used. For a Type 3 PH, V=0 indicates a real transmission on Sounding Reference Signal (SRS) and V=1 indicates that an SRS reference format is used. Furthermore, for Type 1, Type 2, and Type 3 PHs, V=0 indicates the presence of the octet containing the associated PCMAX,c field, and V=1 indicates that the octet containing the associated PCMAX,c field is omitted.

With continued reference to FIGS. 1A-1B, the "PH" field 140 may indicate the headroom level. The length of this field, as shown, is 6 bits. The reported PH and the corresponding power headroom levels are described in the table 6.1.3.6-1 of the TS 36.133 (the corresponding measured values in dB can be found in subclause 9.1.8.4 of the TS 36.133). The "P" field 145 may indicate whether power backoff due to power management is applied (as allowed by P-MPRc introduced in the TS 36.101). The MAC entity should set P to "1" if the corresponding PCMAX,c field would have had a different value if no power backoff due to power management had been applied. The contents of 3GPP TS 36.101 and TS36.133 are incorporated by reference in their entirety.

Lastly, the PCMAX,c field 150, if present, may indicate the PCMAX,c or PCMAX,c (which is introduced in the TS 36.213, the content of which is incorporated by reference in its entirety) used for calculation of the preceding PH field. The reported PCMAX,c and the corresponding nominal UE transmit power levels are described in table 6.1.3.6a-1 of the TS 36.133 (the corresponding measured values in dBm can be found in subclause 9.6.1 of the TS 36.133).

In the following embodiments, an LTE-NR Dual Connection (EN-DC) scenario, in which the Master Node (MN) is an LTE eNB and the Secondary Node(s) is an NR gNB, is used for illustration. The UE may be configured to utilize radio resources provided by the distinct schedulers in two (or more) different nodes. It should be noted, however, that the following embodiments, mechanisms, and methods may equally apply to an NR-E-UTRAN DC case, in which the MN is an NR gNB and the SN(s) is an LTE eNB, and an NR-NR DC case, in which the NB is an NR gNB and the SN(s) is also an NR gNB. The following embodiments, mechanisms, and methods may also apply to the multiple connectivity cases in which there are more than two SNs to serve the UE and the SNs may include gNB(s), eNB(s), or any combination thereof. The following embodiments may also apply to the Carrier Aggregation (CA) cases that may have only one cell group, or multiple cell groups, with a single base station for a UE.

A UE, in some of the present embodiments, may transmit a PHR in a communication system that supports multiple carriers, connectivity, and SUL carriers. The UE may calculate the power headroom based on an original uplink (OUL) carrier, and/or an SUL carrier, for each activated serving cell when an indicated cell group(s) uses a maximum transmission power of the UL transmission based on the configurations, one or more trigger conditions that trigger the generation of PHR, and/or a set of predefined rules. The cell group(s), in some of the present embodiments, may be indicated based on the configurations, the trigger conditions, and/or the set of predefined rules.

In some of the present embodiments, the UE may transmit the PHR (e.g., using a DC/ME PHR MAC CE), which may include the power headroom for each activated serving cell with configured uplink, to a base station. The power headroom information that a PHR contains may be different based on the configurations, the trigger conditions, and/or the set of predefined rules. Additionally, the configurations may be different for different indicated cell group(s) in some of the present embodiments. The number of octets with Ci fields used for indicating the presence of PH per serving cell may be different for each reported PHR MAC CE in some of the present embodiments. In some aspects of the present embodiments, the number of octets with Ci fields may be determined based on the configured cell index range of the corresponding cell group, and/or based on other configurations (e.g., dual connectivity configurations, multiple connectivity configurations, carrier aggregation configurations, etc.).

The PHR, in some of the present embodiments, may be transmitted using the structure of a PHR MAC CE. In the PHR MAC CE, in some aspects of the present embodiments, one bit is used (as described in more detail below) to indicate whether the PH of the SUL associated with the serving cell is present or not. In some of the present embodiments, including the PH of an OUL carrier and/or an SUL carrier associated with a serving cell may depend on the configurations, the trigger condition that triggers the PHR, and/or a set of predefined rules.

In some aspects of the present embodiments, the value of the PCMAX,c (of the PHR MAC CE) associated with the PH of the OUL carrier may be the same as the value of the PCMAX,c associated with the PH of the SUL carrier of the same serving cell. In some other aspects of the present embodiments, however, the value of the PCMAX,c associated with the PH of the OUL carrier may be different from the value of the PCMAX,c associated with the PH of the SUL carrier of the same serving cell. In some of the present embodiments, whether the PH of the SUL associated with the serving cell is present in a PHR MAC CE may depend on the SRS configurations and/or the allocated resources for the UL data transmission.

In some of the present embodiments, for some PHR trigger conditions, depending on the conditions that trigger the PHR, the PHR MAC CE may contain the PHs of all serving cells (if reported) of all cell groups, and also the PHs of the configured SUL carriers of the associating activated serving cells. Furthermore, depending on the conditions that trigger the PHR, for some PHR trigger conditions, the PHR MAC CE may contain the PHs of the serving cells (if reported) of the associated cell group, and also the PHs of the configured SUL carriers of the associating activated serving cells.

In some of the present embodiments, for some PHR trigger conditions, depending on the conditions that trigger the PHR, the PHR MAC CE may contain the PHs of the serving cells (if reported) of the associated cell group. In some such embodiments, the PHs of the OUL carriers and the configured SUL carriers may be included depending on the SRS configurations and/or the allocated resources for U L data transmission.

In some of the present embodiments, for some PHR trigger conditions, depending on the conditions that trigger the PHR, the PH R MAC CE may contain the PHs of configured SUL carriers of the associating activated serving cell only (e.g., a reserved bit in the Ci field may be used to indicate whether the PHR MAC CE is for the OUL only or not). In some aspects of the present embodiments, for some PHR trigger conditions, the PHR MAC CE may contain the PHs of the configured OUL carriers only based on the conditions that trigger the PHR.

In some aspects of the present embodiments, a basic Multiple Entry PHR MAC CE is identified by a MAC PDU subheader with LCID in a Multi-Radio Access Technology (RAT)-Dual Connectivity (MR-DC) scenario. The ME PHR MAC CE may include a bitmap, a type 2 PH field for the SpCell of the other MAC entity, a type 1 PH field for the Primary Cell (PCell), and one or more type X PH fields for the serving cells in an ascending order according to the Serving Cell Index (ServCellIndex), where X is either 1 or 3 based on the configurations and/or one or more predefined rules.

In some aspects of the present embodiments, if the stop value of the SN cell index range is less than 8 (e.g., assuming that the UE knows the stop value by signaling), one octet with Ci fields is used for indicating the presence of PH per serving cell with configured uplink for the DC PHR MAC CE (or ME PHR MAC CE). On the other hand, if the stop value of the SN cell index range is equal to, or more than, 8, four octets with Ci fields are used for indicating the presence of PH per serving cell with configured uplink for the dual connectivity PHR MAC CE (or the ME PHR MAC CE).

It should be noted that the Ci field in the DC PHR MAC CE (or ME PHR MAC CE) may indicate the presence of a PH field for the (activated) serving cell with configured uplink of any MAC entity, except the PCell, with ServCellIndex or SCellIndex i (which is assigned by MeNB or SgNB in response to the associated cell index range). The Ci field set to "1" may indicate that a PH field for the serving cell with ServCellIndex or SCellIndex i is reported. Generally, only the PH of an activated serving cell is required to be reported in the corresponding PHR. The Ci field set to "0" may indicate that a PH field for the serving cell with ServCellIndex or SCellIndex i is not reported.

Figure 2:
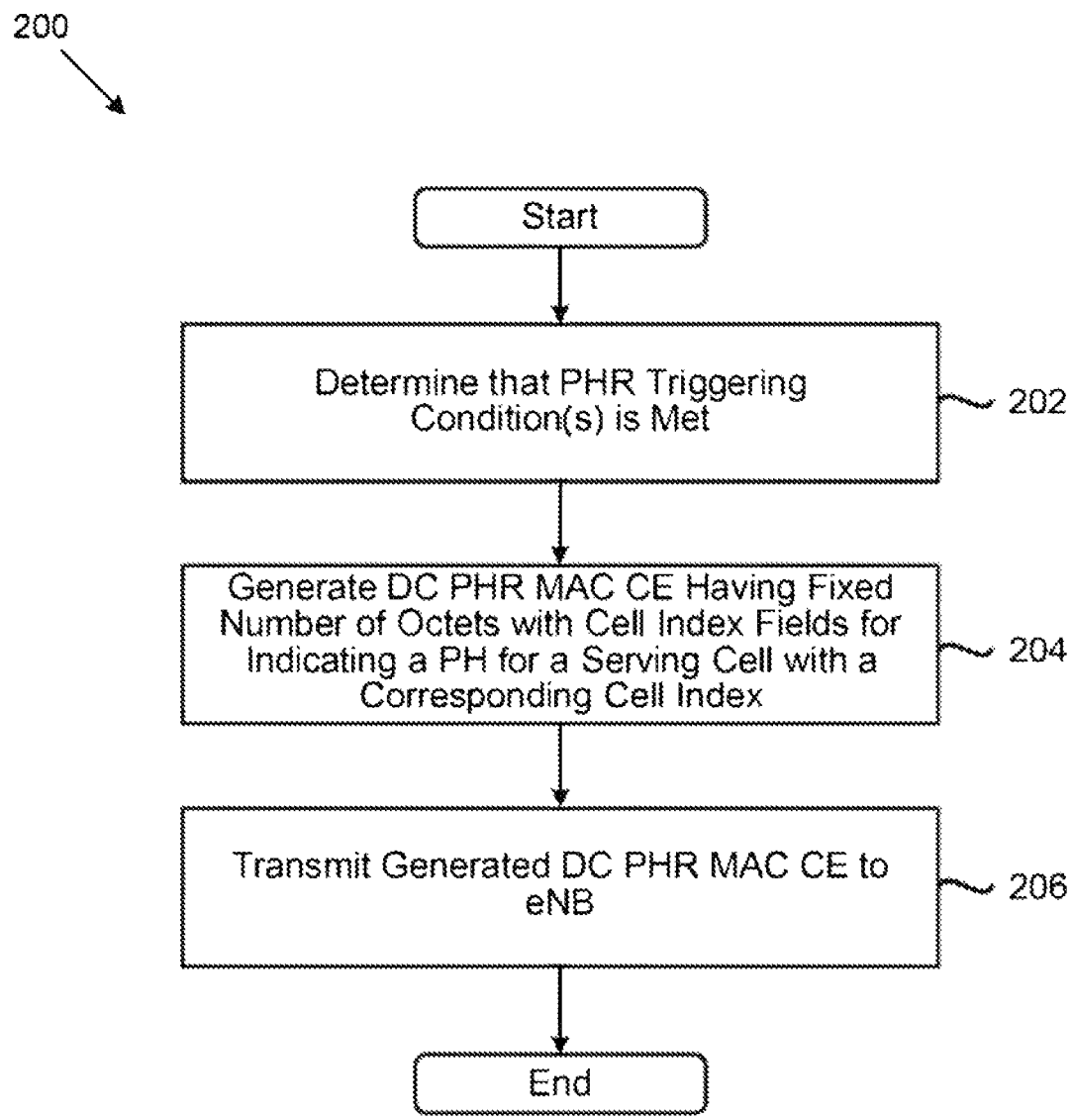
FIG. 2 is a flowchart illustrating a method (or process) performed by a UE for generating a DC PHR MAC CE in a MR-DC scenario, according to an example implementation of the present application.

FIG. 2 is a flowchart illustrating a method (or process) 200 performed by a UE for generating a DC PHR MAC CE in a MR-DC scenario, according to an example implementation of the present application. For example, the process 200 may be performed by a UE in an LTE-NR Dual Connection (EN-DC) scenario, in which the UE is in communication with a Master eNB (MeNB) and a Secondary gNB (SgNB).

As shown in FIG. 2, in some of the present embodiments, the process 200 may start with action 202 in which the process may determine that one or more PHR triggering conditions are met. The PHR triggering conditions, as discussed above, may include, but are not limited to, a Pathloss change, a P-MPR change, a Serving Cell activation, etc.

In action 204, in response to determining the triggering condition(s) is met, the method may generate (or configure) a DC PHR MAC CE that may include a fixed number of octets with cell index fields (e.g., Ci fields) for indicating the presence of the power headroom (e.g., whether the power headroom is reported or not) for different serving cells with a corresponding cell index. In some aspects of the present embodiments, the method may generate a DC PHR MAC CE that includes one octet with serving cell indices, each of which indicating the presence (or non-presence) of the PH for the respective cell. In some other embodiments, the method may generate a DC PHR MAC CE that includes four octets with serving cell indices. In some of the present embodiments, the method may generate the DC PHR MAC CE with one octet with Ci fields which indicates the presence of a PH field for the serving cell of any MAC entity, except the PCell, with ServCellIndex (for EN-DC case) or SCellIndex i, irrespective of the highest value indicated in the SCellIndex (or ServingCellIndex) field of serving cells (or secondary cells) with configured uplink and/or the stop value of the SN cell index range. In some of the present embodiments, the method may generate the DC PHR MAC CE with four octets with Ci fields which indicates the presence of a PH field for the serving cell of any MAC entity, except the PCell, with ServCellIndex (for EN-DC case) or SCellIndex i, irrespective of the highest value indicated in the SCellIndex (or ServingCellIndex) field of serving cells (or secondary cells) with configured uplink and/or the stop value of the SN cell index range.

In some of the present embodiments, the highest value indicated in the SCellIndex or (ServingCellIndex) field and/or the stop value of the SN cell index range may be signaled (e.g., via an RRC message) by a master eNB (or a master gNB) to a UE. In action 206, after generating (or configuring) the DC PHR MAC CE with the fixed number of cell indices, the method may transmit the generated DC PHR MAC CE to the MeNB in some of the present embodiments. The process may then end.

Figure 3:
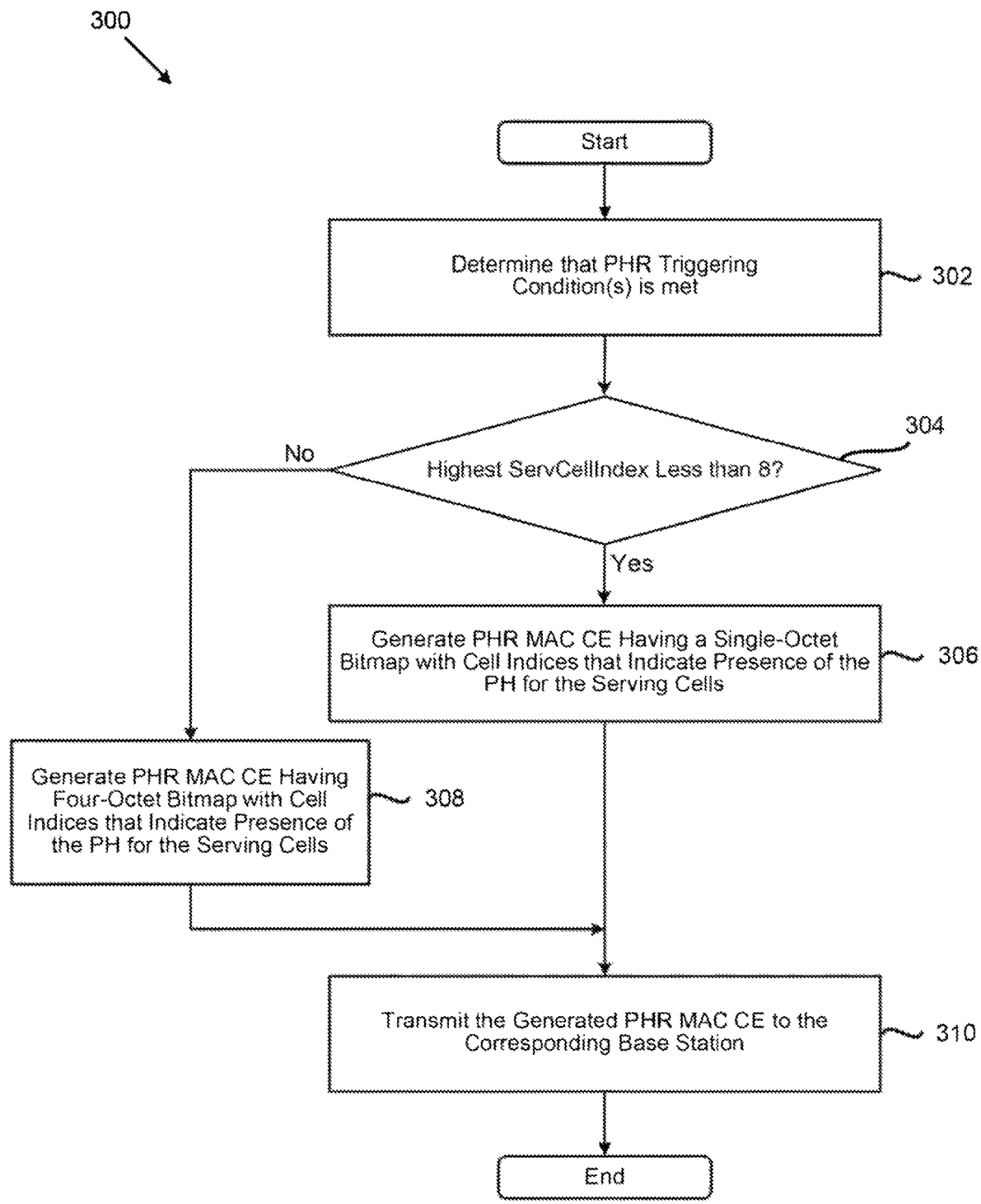
FIG. 3 is a flowchart illustrating a method (or process) performed by a UE for generating a PHR MAC CE in a MR-DC scenario, according to an example implementation of the present application.

FIG. 3 is a flowchart illustrating a method (or process) 300 performed by a UE for generating a PHR MAC CE in a MR-DC scenario, according to an example implementation of the present application. For example, the process 300 may be performed by a UE in an NE-DC scenario, in which the UE is in communication with an MgNB and an SeNB.

As shown in FIG. 3, in some of the present embodiments, the method 300 may start with action 302. In action the method may determine that one or more PHR triggering conditions are met. The PHR triggering conditions may include, but are not limited to, a Pathloss change, a P-MPR change, a Serving Cell activation, etc.

In action 304, in response to receiving the triggering condition(s), the method 300 may determine whether the highest value indicated in the SCellIndex (or ServingCellIndex) field of serving cells (or secondary cells) with configured uplink (or the stop value of the SN cell index range) is less than 8 or not. If the method determines that the value is less than 8, the method of some embodiments may generate, in action 306, a PHR MAC CE that includes one octet with serving cell indices (e.g., Ci filed). Each of the serving cell indices may indicate the presence (or non-presence) of the PH for the respective serving cell in some of the present embodiments. After generating (or configuring) the PHR MAC CE, the process 300 may proceed to action 310, which is described below. As discussed above, in some of the present embodiments, the highest value indicated in the SCellIndex (or ServingCellIndex) field of serving cells (or secondary cells) with configured uplink and/or the stop value of the SN cell index range may be signaled (e.g., via an RRC message) by a master eNB (or a master gNB).

Alternatively, if in action 304, the method 300 determines that the highest value indicated in the SCellIndex (or ServingCellIndex) field of serving cells (or secondary cells) with configured uplink (or the stop value of the SN cell index range) is more than, or equal to, 8, the method of some embodiments may generate, in action 308, a PHR MAC CE that includes four octets with serving cell indices (e.g., Ci filed). In action 310, after generating (or configuring) the PHR MAC CE with the determined number of cell indices, the method may transmit the generated PHR MAC CE to the corresponding serving base station (e.g., an eNB) in some of the present embodiments. The method 300 may then end.

In some of the present embodiment, if the stop value of the SN cell index range is less than 8, one octet with Ci fields is used for indicating the presence of PH per serving cell for the PHR MAC CE (e.g., DC PHR MAC CE or ME PHR MAC CE). If the stop value of the SN cell index range is greater than 7 but less than 16, in some aspects of the present embodiments, two octets with Ci fields are used for indicating the presence of PH per serving cell for the PHR MAC CE. If the stop value of the SN cell index range is greater than 15 but less than 24, three octets with Ci fields are used for indicating the presence of PH per serving cell for the PHR MAC CE. And if the stop value of the SN cell index range is equal to or more than 24, four octets with Ci fields are used for indicating the presence of PH per serving cell for the PHR MAC CE.

In some of the present embodiments, the PHR MAC CE (e.g., DC PHR MAC CE or ME PHR MAC CE) sent to the MCG and the SCG, or to different cell groups in a CA case, may include different octets with Ci fields (e.g., when the PH of the serving cells in one cell group do not need to be reported to another cell group). In some aspects of the present embodiments, the following principle is used to set the number of octets with Ci fields in the PHR MAC CE for different nodes (e.g., Master Node or Secondary Node(s) in an EN-DC scenario), or for different cell groups in a CA case. In one aspect of the present embodiment, when the maximum number of serving cells (that could be configured) of a cell group is less than 8, one octet with Ci fields in the PHR MAC CE may be used to indicate the presence of PH per serving cell.

On the other hand, if the maximum number of serving cells (that could be configured) of a cell group is greater than 7, but less than 16, two octets with Ci fields in the PHR MAC CE may be used for indicating the presence of PH per serving cell. Similarly, if the maximum number of serving cells of a cell group is greater than 15, but less than 24, three octets with Ci fields in the PHR MAC CE may be used for indicating the presence of PH per serving cell. And, if the maximum number of serving cells of a cell group is more than 23, four octets with Ci fields in the PHR MAC CE may be used to indicate the presence of PH per serving cell.

Figure 4:
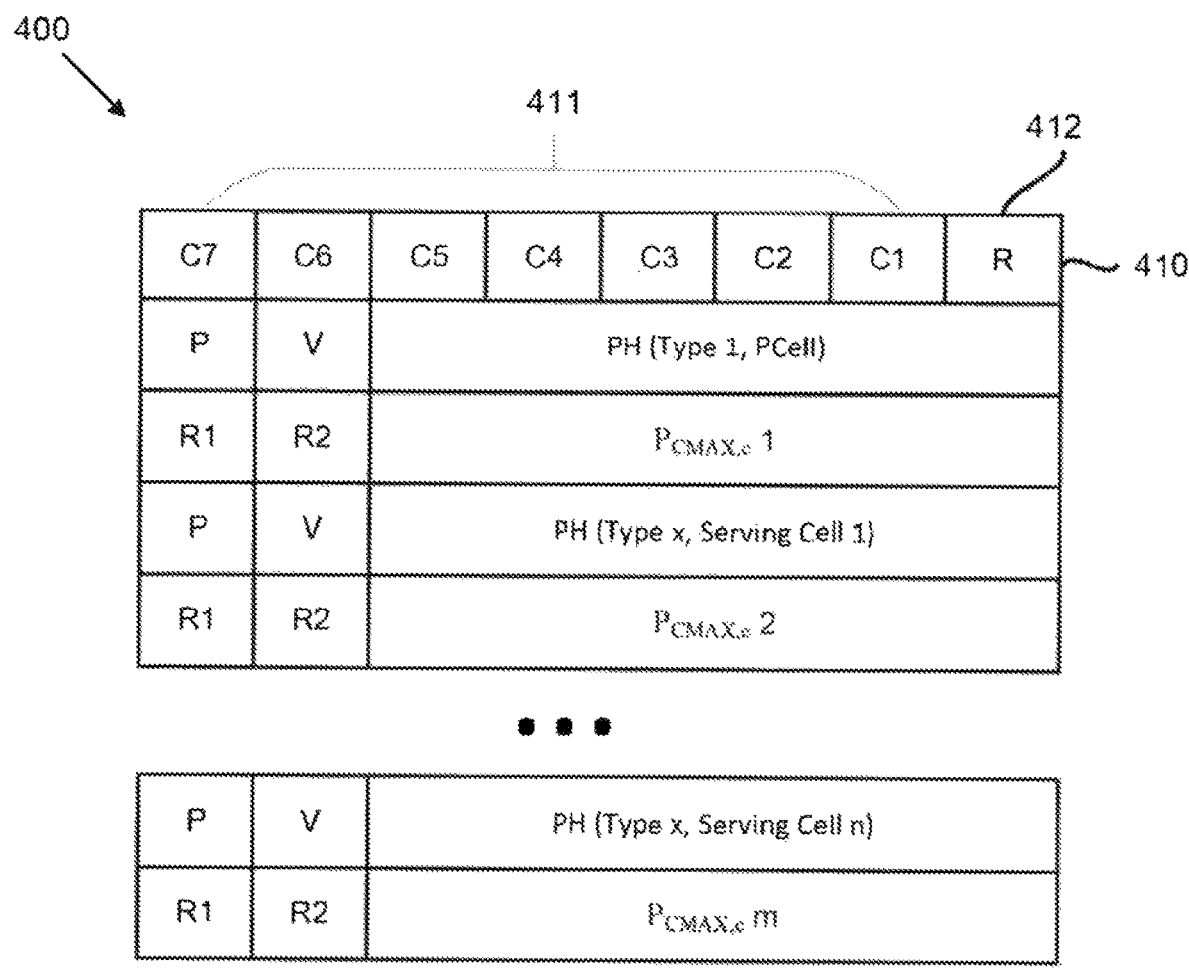
FIG. 4 illustrates a first number of octets may be assigned in the ME PHR MAC CE for the serving cells of the MCG when the MN cell index range is set to a particular number, according to an exemplary implementation of the present application.
Figure 5:
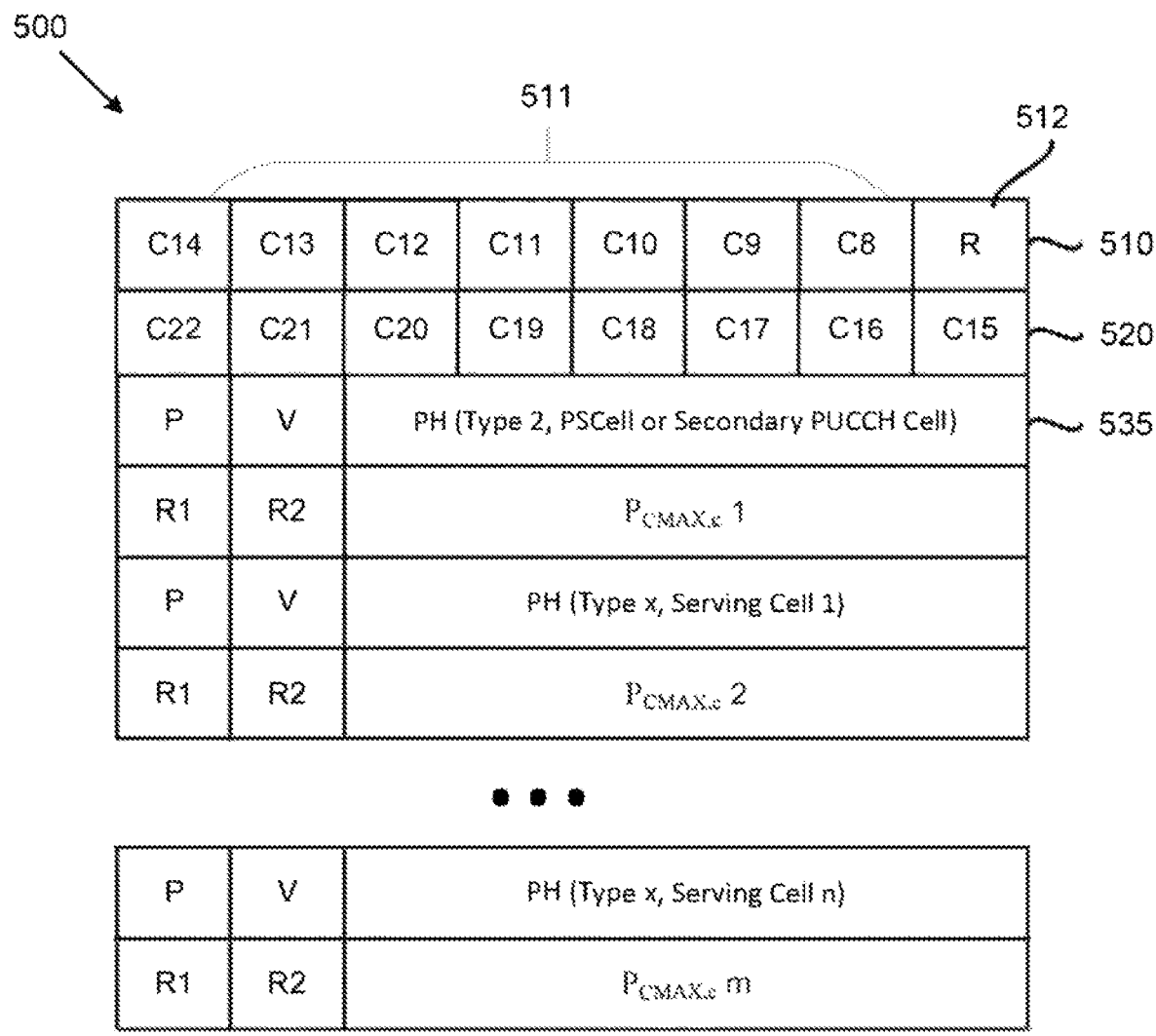
FIG. 5 illustrates assignment of a second number of octets in the ME PHR MAC CE for the serving cells of the SCG with different cell index range as shown in FIG. 4, according to an exemplary implementation of the present application.

FIGS. 4 and 5 illustrate ME PHR MAC CEs having different number of octets with Ci fields for different serving cell groups. Specifically, FIG. 4 illustrates a first number of octets may be assigned in the ME PHR MAC CE 400 for the serving cells of the MCG when the MN cell index range is set to a particular number, according to an exemplary implementation of the present application. On the other hand, FIG. 5 illustrates assignment of a second number of octets (different than the first number of octets in FIG. 4) in the ME PHR MAC CE 500 for the serving cells of the SCG with different cell index range as shown in FIG. 4, according to an exemplary implementation of the present application.

In the example illustrated by FIGS. 4-5, the SN cell index range is assumed to be set from 8 to 22. That is, as shown in FIGS. 4 and 5, at most, 7 secondary cells 411 may be configured in the MCG (bit 412 being a reserved bit), and also, at most, 15 secondary cells 511 may be configured in the SCG (bit 512 being a reserved bit). In such a scenario, as shown in FIG. 4, one octet 410 with Ci fields 411 may be used for indicating the presence of power headroom per serving cell of the master cell group in the ME PHR MAC CE 400. FIG. 5, on the other hand, shows that two octets 510 and 520 with Ci fields 511 may be used for indicating the presence of a power headroom per serving cell of the secondary cell group in the associated multiple entry PHR MAC CE 500.

In a Carrier Aggregation (CA) scenario, there may be two cell groups with a primary PUCCH cell in one cell group and a secondary PUCCH cell in the other cell group. Some of the present embodiments may set the reserved bit "R" (e.g., the reserved bit 412 or 512 with reference to FIGS. 4 and 5, respectively) to different values to differentiate between a primary PUCCH cell group and a secondary PUCCH cell group in CA. In some of the present embodiments, for the cell group that includes the Primary PUCCH cell, the PHR format may be the same format as shown in FIG. 4. That is, one octet 410 may be assigned to the PHR MAC CE 400, while the reserved bit 412 is set to a predefined value (e.g., to a default value of "0") to indicate that the PHR is for the cell group that includes the primary PUCCH cell.

In some such embodiments, for the cell group that includes the secondary PUCCH cell, the PHR format could be the same format as shown in FIG. 5 (e.g., two octets 510 and 520 are assigned to the PHR MAC CE 500). In one aspect of the present embodiments, for the cell group that includes the secondary PUCCH cell, however, the SpCell 535 shown in FIG. 5 may be replaced by the secondary PUCCH cell, and the reserved bit "R" is set to a predefined value, that is different from the predefined value of the reserved bit used for the primary PUCCH cell (e.g., the reserved bit 512 may be set to a default value of "1"), to indicate that the PHR is for the cell group that includes the secondary PUCCH cell. In some of the present embodiments, the same type of rules may apply to a CA scenario that defines the number of octet(s) with Ci fields to be used for indicating the presence of PH per serving cell in the corresponding PHR MAC CE.

In some of the present embodiments, there may be more than two secondary nodes that serve the UE (e.g., in a multiple connectivity case). For example, if an MeNB requests a first SgNB and a second SgNB to serve a UE, and both of the first and second SgNBs accept the request, the UE may enter into a multiple connectivity mode (i.e., the UE may use the radio resources offered by the MeNB, the first SgNB, and the second SgNB). For power headroom reporting in a multiple connectivity mode, in some of the present embodiments, the MeNB may signal a first SN cell index range and a second SN cell index range for both of the first SgNB and the second SgNB. In some aspects of the present embodiments, the PHR MAC CE may be sent to the MCG, a first SCG (e.g., associated with the first SgNB) and a second SCG (e.g., associated with the second SgNB). In some aspects of the present embodiments, the transmitted PHR for the different nodes may include different octets with Ci fields (e.g., the PH of the serving cells in one or more cell groups do not need to report to the cell group that triggers the PHR), using ME PHR MAC CE (or DC PHR MAC CE).

Some of the present embodiments may set the number of octets with Ci fields in the PHR MAC CE (e.g., DC PHR MAC CE or ME PHR MAC CE) for the different nodes (e.g., a master node or a secondary node(s) in an EN-DC scenario) in the following manner. If the maximum number of serving cells of a cell group (that could be configured) is less than 8, one octet with Ci fields is used for indicating the presence of PH per serving cell in the PHR MAC CE. If the maximum number of serving cells of a cell group that could be configured is more than 7 but less than 16, two octets with Ci fields may be used for indicating the presence of PH per serving cell in the PHR MAC CE. If the maximum number of serving cells of a cell group that could be configured is more than 15 but less than 24, three octets with Ci fields may be used for indicating the presence of PH per serving cell in the PHR MAC CE. If the maximum number of serving cells of a cell group that could be configured is more than 23, four octets with Ci fields may be used for indicating the presence of PH per serving cell in the PHR MAC CE.

In some of the present embodiments, the PHR MAC CE sent to the MCG may always uses a fix number of octets (e.g., based on the configurations, based on a set of predefined rules, based on a default value, etc.) with Ci fields. For example, in some of the present embodiments, the PHR MAC CE sent to the MCG may always use two octets, or any other number of octets, with Ci fields. In some of the present embodiments, in an EN-DC scenario, the PHR MAC CE sent to LTE master node may always use four octets with Ci fields.

In some of the present embodiments, the PHR MAC CE sent to the SCG may use two octets, or any other number of octets (e.g., based on the configurations or a set of predefined rules or a default value), with Ci fields. In some of the present embodiments, in an EN-DC scenario, four octets with Ci fields may be used, in a DC PHR MAC CE, in order to report the PH to an LTE MN. In some such embodiments, for reporting the PH to an LTE SN, the DC PHR MAC CE may use four octets with Ci fields.

In some of the present embodiments, in a CA scenario, the PHR MAC CE (e.g., DC PHR MAC CE or ME PHR MAC CE) sent to the cell group with the primary PUCCH cell and the PHR MAC CE sent to the cell group with the secondary PUCCH cell may have two octets, or any other number of octets (e.g., depending on the configurations, predefined rules, default values, etc.) to show the Ci fields. In some such embodiments, the PH of the serving cells in one cell group does not need to be reported to the other cell group. The reserved bit of the two octets with Ci fields for the PHR MAC CE sent to the cell group with the primary PUCCH cell and for the PHR MAC CE sent to the cell group with the secondary PUCCH cell, in some of the present embodiments, may be set to different predefined (or default) values. For example, in some aspects of the present embodiments, the reserved bit of the PHR MAC CE that is sent to the cell group with the primary PUCCH cell may be set to "0", while the reserved bit of the PHR MAC CE that is sent to the cell group with the secondary PUCCH cell may be set to "1".

In some of the present embodiments, for reporting the PHR MAC CE, two additional LCIDs may be used to indicated different PHR MAC CE format. For example, in some such embodiments, one LCID for identifying that the PHR MAC CE is with 1 octet containing the Ci fields, and another LCID for identifying that the PHR MAC CE is with 4 octets containing the Ci fields may be used. In some embodiments, in an MR-DC scenario, for reporting the PH to an LTE MN, or an LTE SN, different LCIDs for identifying different PHR formats may be used. For example, in some of the present embodiments, one LCID for identifying that the DC PHR MAC CE is with one octet containing the Ci fields may be used, and another LCID for identifying that the DC PHR MAC CE is with four octets containing the Ci fields may be used.

In one aspect of the present embodiments, one common LCID for identifying a DC PHR MAC CE for both one octet and four octets of the Ci fields may be used. In other aspects of the present embodiments, one LCID may be used for identifying a DC PHR MAC CE including one octet of the Ci fields. The other LCID may be used for identifying a DC PHR MAC CE including four octets of the Ci fields. In another aspect of the present embodiments, one common LCID for identifying a DC PHR MAC CE for both one octet or four octets of the Ci fields may be used for different scenarios (e.g., EN-DC or LTE DC scenarios), except for NE-DC scenario, and another LCID for identifying a DC PHR MAC CE including four octets of the Ci fields may be used specifically for NE-DC scenario. In some embodiments, one common LCID for identifying a DC PHR MAC CE for both one octet or four octets Ci fields may be used for different scenarios e.g., EN-DC or LTE DC scenarios), except for NE-DC scenario. Moreover, an LCID for DC PHR MAC CE with one octet Ci fields and another LCID for DC PHR with four octet Ci fields may be used specifically for NE-DC scenario.

Some embodiments use the following methods and techniques when both of the UE MAC entities trigger the PHR (e.g., in response to one or more predefined PHR triggering conditions), and/or when only a corresponding UE MAC entity triggers the PHR (e.g., in response to one or more predefined, or configured PHR triggering, conditions). In some of the present embodiments, the described methods and techniques apply when the PHR MAC CE contains the PIs of all (activated) serving cells (if reported) of all cell groups, and also the PHs of the configured SUL carriers (e.g., that are associated with the reported serving cells).

FIGS. 6 and 7 illustrate different configurations for a PHR MAC CE to differentiate between an OUL with a configured SUL and an OUL that is not configured with an SUL. Specifically, FIG. 6 illustrates a PHR MAC CE 600 that is configured to show that a serving cell is not associated with an SUL, according to an exemplary implementation of the present application. FIG. 7, on the other hand, illustrates a PHR MAC CE 700 that is configured to indicate the presence of a PH of an SUL associated with a serving cell, according to an exemplary implementation of the present application.

In some aspects of the present embodiments, when one octet 610 with Ci fields is used to indicate the presence of a PH per serving cell, a reserved bit R1 (or R2) may be used to indicate whether the PH of the SUL associated with the serving cell is present or not. For example, in some of the present embodiments, if the reserved bit 612 (or 613) is set to a predefined (or default) value, such as "0", for a particular serving cell, it may indicate that no SUL is configured for the particular serving cell, and as such, the PH for an associated SUL is not present. As shown in FIG. 6, when there is no SUL configured for the serving cell 620 (serving cell 1 OUL), the reserved bit R1 612 (or R2) may be set to "0", which may indicate that there is no PH of an SUL associated with the serving cell (e.g., that would follow the PH for serving cell 620). The serving cell 1 OUL, in some of the present embodiments, indicates the original UL carrier that is paired with the DL carrier of the serving cell (e.g., serving cell 620 in the example illustrated by FIG. 6).

It should be noted that in some of the present embodiments, the Type X in any of the FIGS. 6 and 7 may be set to a fixed type (e.g., set to Type 1), such that based on the SCellIndex (or ServCellIndex) value, one or several Type 1 PH fields and octets containing the associated PCMAX,c fields (if reported) for the serving cells, and the associated SUL carrier (if reported), may be indicated in the bitmap. Alternatively, the Type X, in some embodiments, may be reported based on the configurations, such that based on the SCellIndex (or ServCellIndex) value, one or several Type 1 PH fields and octets containing the associated PCMAX,c fields (if reported) for the serving cells, and the associated SUL carrier (if reported), may be indicated in the bitmap. The following figures could also apply the fixed type (e.g., TYPE 1) for TYPE X or the TYPE X for each reported PH based on the configurations.

As shown in FIG. 7, when an SUL is configured for a serving cell (e.g., the serving cell 730 in the illustrated example), some embodiments may set the reserved bit 712 (or 713) to a different predefined value (e.g., different than when the SUL is not configured for the serving cell), such as "1" to show that there is a corresponding PH for the SUL field 740 that is associated with the serving cell 730. It should be noted that the reserved bit R3 (715) may be set to "0" for the SUL PH field 740 in some of the present embodiments.

The values of the PCMAX,c associated with the PH of the OUL carrier and the PCMAX,c associated with the PH of the SUL carrier of the same serving cell may be the same or different in different embodiments. For example, in one aspect of the present embodiments, the value of the PCMAX,c associated with the PH of the OUL carrier and the value of the PCMAX,c associated with the PH of the SUL carrier of the same serving cell may be the same (e.g., the configured UE transmitted power of the serving cell). In another aspect of the present embodiments, the value of the PCMAX,c associated with the PH of the OUL carrier and the value of the PCMAX,c associated with the PH of the SUL carrier of the same serving cell may be different.

For example, the value of the PCMAX,c associated with the PH of the OUL carrier of a particular serving cell may be the configured UE transmitted power of the serving cell, while the value of the PCMAX,c associated with the PH of the SUL carrier of the same particular serving cell may be the configured UE transmitted power of the SUL carrier. In some of the present embodiments, the gNB may signal the two different PCMAX,c values via a Radio Resource Control (RRC) message and may reconfigure the values dynamically.

Figure 8:
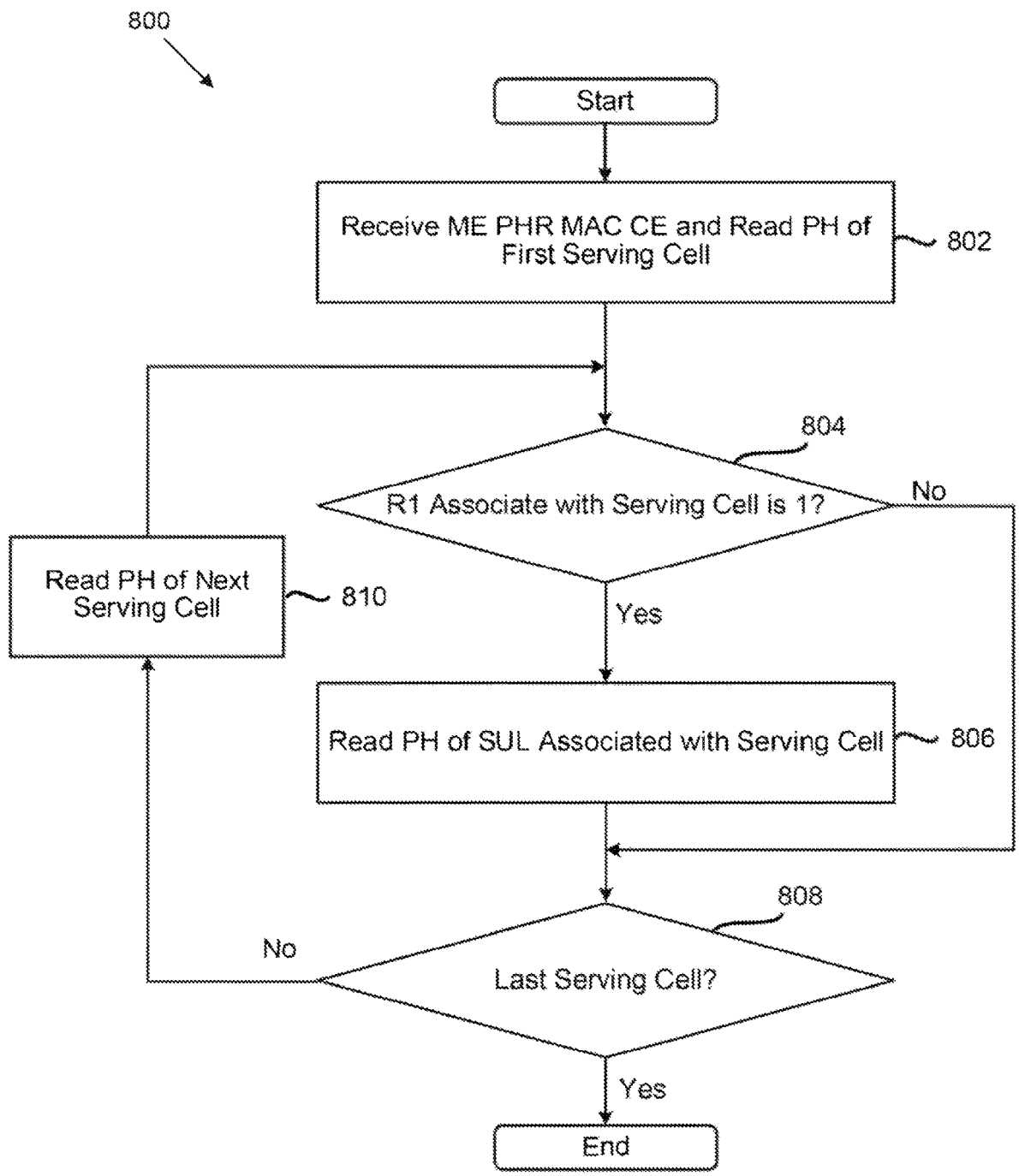
FIG. 8 is a flowchart illustrating a method (or process) performed by a node (e.g., an MgNB or an SgNB) for receiving the PHs of different serving cells that may or may not be associated with SULs, according to an example implementation of the present application.

FIG. 8 is a flowchart illustrating a method (or process) 800 performed by a node (e.g., an MgNB or an SgNB) for receiving the PHs of different serving cells that may or may not be associated with SULs, according to an example implementation of the present application. The method 800 may start by performing action 802. In action 802, the method may receive a ME PHR MAC CE that is generated (e.g., by a UE) to indicate the presence of PHs for both OULs and SULs. After receiving the ME PHR MAC CE, the method 800 may read the first serving cell data configured in the ME PHR MAC CE.

In action 804, the method 800 may determine whether an SUL is associated with the serving cell by determining the value of a reserved bit in the succeeding PCMAX,c field, such as the reserved bit 612 or 712 with reference to FIGS. 6 and 7, respectively. When the method determines that the value of the reserved bit is set to "1", the method 800 may realize that a PH for an associated SUL is present and as such read, at action 806, the PH of the SUL that is associated with the serving cell, the data of which is being processed. The method 800 may then determine whether the serving cell, the data of which is being processed, is the last serving cell (e.g., based on the data in the Ci fields of the ME PHR MAC CE which indicates the present of a PH field for the Serving Cell with ServCellIndex i).

In action 808, the method 800 may determine whether the processed serving cell is the last serving cell in the ME PHR MAC CE. When the method 800 determines that the serving cell is not the last serving cell in the ME PHR MAC CE, the method may read the PH for the next serving cell (in action 810) and loop back to action 804. On the other hand, if the method 800 determines that the serving cell is the last serving cell in the ME PHR MAC CE, the process may end.

In some of the present embodiments, even when an SUL is configured for a serving cell, the inclusion of the values of the PH and the PCMAX,c associated with the PH of the OUL carrier (or the SUL) in the PHR, may depend on the SRS configurations, or the allocated resources for the UL data transmission. For example, in some of the present embodiments, the values of the PH and the PCMAX,c associated with the PH of the OUL carrier of a serving cell may be included in the PHR when the serving cell indicated the corresponding UL data transmission or the configured SRS of the OUL carrier. In some of the present embodiments, the values of the PH and the PCMAX,c associated with the PH of the SUL carrier of a serving cell may be included in the PHR when the serving cell has indicated the corresponding UL data transmission, or the configured SRS of the SUL carrier.

FIG. 9 illustrates an example of including the values of the PH and the PCMAX,c associated with the PH in a PHR MAC CE 900, according to an example implementation of the present application. In the illustrated example, serving cell 1 (910) only uses the OUL for the UL data transmission, while serving cell 2 (920) only uses the SUL for the UL data transmission. On the other hand, serving cell 3 (930) has configured SRS for both the SUL and the OUL. In some of the present embodiments, for the serving cells 910 and 920, the reserved bit R1 (or R2) may be set to a predefined value, such as "0", while for the serving 930, since the PH for both of the OUL and the SUL are reported, the reserved bit R1 (or R2) of the OUL may be set to a different predefined value, such as "1". The corresponding PH of the SUL 940 associated with the serving cell 930, as shown in the figure, may follow the PH of the OUL in the PHR. It should be noted that the reserved bit R3 950 may be set to "0".

The value of the PCMAX,c associated with the PH of the OUL carrier and the value of the PCMAX,c associated with the PH of the SUL carrier of the same serving cell, in some of the present embodiments, may be the same or different. For example, the value of the PCMAX,c associated with the PH of the OUL carrier and the value of the PCMAX,c associated with the PH of the SUL carrier of the same serving cell may be the same and equal to the configured UE transmitted power of the serving cell in some of the present embodiments. In some other embodiments, the value of the PCMAX,c associated with the PH of the OUL carrier and the value of the PCMAX,c associated with the PH of the SUL carrier of the same serving cell may be the configured UE transmitted power of the serving cell, while the value of the PCMAX,c associated with the PH of the SUL carrier of the same serving cell may be the configured UE transmitted power of the SUL carrier. The gNB may signal the two different values via an RRC message and may reconfigure the values dynamically in some of the present embodiments. In some of the present embodiments, the same mechanism may be applied to the PHR MAC CE with different octets with Ci fields, which is used for indicating the presence of PH per serving cell.

FIGS. 10 and 11 illustrate usage of a reserved bit the PHR MAC CE structure, that is configured with four octet Ci fields, to indicate the presence of the PH for an SUL associated with a serving cell. Specifically, FIG. 10 illustrates a ME PH R MAC 1000 configured to indicate that the PH of an SUL associated with a serving cell is not present, according to an exemplary implementation of the present application. On the other hand, FIG. 11 illustrates a ME PHR MAC 1100 configured to indicate that the PH of an SUL associated with a serving cell is present, according to an exemplary implementation of the present application.

In some of the present embodiments, when four octets with Ci fields are used to indicate the presence of PH per serving cell, a reserved bit R1 (or R2) may be used to indicate whether the PH of the SUL associated with the serving cell is present or not. In some embodiments, if the reserved bit R1 (or R2) is set to one particular (predefined) value, the PH of the SUL associated with the serving cell may not be present, while, when the reserved bit R1 (or R2) is set to another predefined value, the PH of the SUL associated with the serving cell may be present.

FIG. 10 shows that when there is no SUL configured for the serving cell 1020, the reserved bit R1 may be set to "0". The reserved R1 being set to "0" may indicate that no PH for the SUL associated with the serving cell 1020 may follow the PH for the serving cell 1 OUL (1020). It should be noted that the OUL for the serving cell 1 is the original UL carrier that is paired with the DL carrier of the serving cell 1.

FIG. 11 shows that when there is SUL configured for the serving cell 1120, the reserved bit R1 may be set to "1" to indicate that the PH for the SUL carrier is present. As shown in the figure, the corresponding PH for the SUL 1130 associated with the serving cell 1120 follows the PH for the c OUL associated with the serving cell 1120. It should be noted that the reserved bit R3 (1140) may be set to "0".

Similar to one octet PHR, for four octet PHRs, the value of the PCMAX,c associated with the PH of the OUL carrier and the value of the PCMAX,c associated with the PH of the SUL carrier of the same serving cell may be the same or different in some of the present embodiments. For example, the value of the PCMAX,c associated with the PH of the OUL carrier and the value of the PCMAX,c associated with the PH of the SUL carrier of the same serving cell may be the configured UE transmitted power of the serving cell in some aspects of the present embodiments. In some other aspects if the present embodiments, the value of the PCMAX,c associated with the PH of the OUL carrier may be the configured UE transmitted power of the serving cell, while the value of the PCMAX,c associated with the PH of the SUL carrier of the same serving cell may be the configured UE transmitted power of the SUL carrier. Similarly, the gNB may signal the two different values via an RRC message and may also reconfigure the values dynamically in some of the present embodiments.

In some of the present embodiments, the UE may use two or three octets with Ci fields in the PHR MAC CE structure to indicate the presence of the PH per serving cell. For example, based on the stop value of the SN cell index range, the UE may use different number of octets with Ci fields for indicating the presence of the PH per serving cell. In some of the present embodiments, the PHR MAC CE reported to a node may only contain the PHs of the (activated) serving cells, and the PHs of the configured SUL carriers (of the reported serving cells), of the cell group that is associated with the node.

For example, in an EN-DC scenario, the PHR MAC CE that is reported to an MeNB may only contain the PHs of the serving cells of the MCG, and the PHR MAC CE that is reported to an SgNB may only contain the PHs of the serving cells, and the configured SUL carriers, of the SCG. As another example, in some of the present embodiments, in an NR CA scenario, the PHR MAC CE reported to a gNB may only contain the PHs of the serving cells, and the configured SUL carriers, of the cell group associated with the primary PUCCH cell, or alternatively, the PHR MAC CE may only contain the PHs of the serving cells, and the configured SUL carriers, of the cell group associated with the secondary PUCCH sell.

In some of the present embodiments, when one octet with Ci fields is used for indicating the presence of the PH per serving cell of the corresponding cell group, a reserved bit R1 (or R2) may be used to indicate whether the PH of the SUL associated with the serving cell is present or not. For example, if the reserved bit R1 (or R2) is set to a predefined value, such as "0", the PH of the SUL associated with the serving cell may not be present. In some of the present embodiments, for the PHR that is reported to the MeNB, the Ci fields are used to indicate the presence of the PH per serving cell of the MCG. In some such embodiments, for the PHR that is reported to the SgNB, the Ci fields are used to indicate the presence of the PH per serving cell of the SCG.

Figure 12:
FIG. 12 illustrates a PHR MAC CE with removed PSCell field for reducing the size of the PHR MAC CE, according to an exemplary implementation of the present application.

FIG. 12 illustrates a PHR MAC CE 1200 with removed PSCell field for reducing the size of the PHR MAC CE, according to an exemplary implementation of the present application. In some of the present embodiments, when one octet with Ci fields is used for indicating the presence of the PH per serving cell of the corresponding cell group, the PH field for the PCell, the PSCell, and/or the PUCCH cell of another cell group may be removed in order to reduce the PHR MAC CE's size. For example, for a PHR that is reported to an MeNB, the Ci fields may be used to indicate the presence of the PH per serving cell of the MCG and, at the same time, the PH(s) that are related to the PSCell may be removed.

FIG. 12 shows that when there is no SUL configured for the serving cell 1220, the reserved bit R1 (or R2) may be set to "0", to indicate that there is no PH of an SUL associated with the serving cell 1220 to follow the PH of the OUL. Therefore, the PH field related to the PSCell has been removed from the PHR MAC CE 1200. That is, as shown in FIG. 12, PHR MAC CE 1200 only includes the PH of a Type 1 PCell 1230 (with no PH of Type 2 PSCell).

In some of the present embodiments, the value of the PCMAX,c associated with the PH of the OUL carrier may be the same as, or different from, the value of the PCMAX,c associated with the PH of the SUL carrier of the same serving cell. For example, the value of the PCMAX,c associated with the PH of the OUL carrier and the value of the PCMAX,c associated with the PH of the SUL carrier of the same serving cell may be the same, and equal to the configured UE transmitted power of the serving cell in some of the present embodiments. In some embodiments, the value of the PCMAX,c associated with the PH of the SUL carrier of the serving cell may be the configured UE transmitted power of the SUL carrier. The gNB of some of the present embodiments may signal the two different values via an RRC message and may reconfigure the values dynamically.

Figure 13:
FIG. 13 illustrates a PHR MAC CE with removed PCell fields in order to reduce the size of the PHR MAC CE, according to an exemplary implementation of the present application.

FIGS. 13 and 14 illustrate two different PHR MAC CE structures that are configured based on whether an SUL is configured for a serving cell. Specifically, FIG. 13 illustrates a PHR MAC CE 1300 with removed PCell fields in order to reduce the size of the PHR MAC CE, according to an exemplary implementation of the present application. FIG. 14 illustrates a PHR MAC CE 1400 with a configured SUL for a serving cell and removed PCell fields, according to an exemplary implementation of the present application.

In some of the present embodiments, the UE may use two or three octets with Ci fields to indicate the presence of the PH per serving cell. In some such embodiments, based on the stop value of the SN cell index range, the UE may use a different number of octets with Ci fields for indicating the presence of the PH per serving cell. For example, for a PHR that is reported to the SgNB, the Ci fields may be used to indicate the presence of the PH per serving cell of the SCG, and at the same time, the PH(s) related to the PCell may be removed. As shown in FIG. 13, if there is no SUL configured for the serving cell 1310, the reserved bit R1 (or R2) may be set to "0", and there may be no following PH for the SUL associated with the serving cell 1310 in the PHR MAC CE 1300. Additionally, the PH related to PCell may also be removed to conserve space in the PHR MAC CE 1300's structure. That is, as shown in FIG. 13, the first field immediately after the octet 1330 with Ci fields, is the Type PSCell field 1320 (with no Type 2 PCell and/or Type 1 PCell preceding the PSCell field 1320).

FIG. 14, on the other hand, shows that when an SUL is configured for the serving cell 1410, the reserved bit R1 (or R2) may be set to a predefined value, such as "1", and a corresponding PH for the SUL (1420) associated with the serving cell may follow the PH for the OUL associated with the serving cell 1410. Additionally, the PH related to the PCell has also been removed for the PHR MAC CE structure. It should be noted that the reserved bit R3 1430 may be set to "0". Furthermore, in some of the present embodiments, the value of the PCMAX,c associated with the PH of the OUL carrier and the value of the PCMAX,c associated with the PH of the SUL carrier of the same serving cell could be the same or different in different embodiments.

For example, in some of the present embodiments, the value of the PCMAX,c associated with the PH of the OUL carrier and the value of the PCMAX,c associated with the PH of the SUL carrier of the same serving cell may be the same, and equal to the configured UE transmitted power of the serving cell. In some other embodiments, the value of the PCMAX,c associated with the PH of the OUL carrier may be the configured UE transmitted power of the serving cell, while the value of the PCMAX,c associated with the PH of the SUL carrier of the serving cell may be the configured UE transmitted power of the SUL carrier. Additionally, the gNB of some of the present embodiments may signal the two different values via an RRC message and may reconfigure the values dynamically.

In some of the present embodiments, a UE may use two or three octets with Ci fields in order to indicate the presence of the PH per serving cell. For example, based on the stop value of the SN cell index range, the UE may use a different number of octets with Ci fields for indicating the presence of the PH per serving cell.

In some of the present embodiments, an PHR MAC CE (e.g., ME PHR MAC CE) may be needed to support reporting of the PH for the OUL only or the SUL only (e.g., when the PHR for the OUL and the PHR for the SUL are associated with different report periodicities, or when the PHR for the OUL and the PHR for the SUL have different triggering conditions and/or corresponding parameters). In some of the present embodiments, therefore, the PHR MAC CE may be designed based on the type of the PHR that is sent to the NW. The reserved bit in the Ci field(s) may be used to indicate whether the PHR MAC CE is for the OUL only or for the SUL only in some of the present embodiments. For example, if the reserved bit is set to a predefined value, such as "0", then the Ci field, in response to the serving cell being configured with the OUL based on the ordered Ci. If the reserved bit is set to a predefined value, such as "1", then the Ci field, in response to the serving cell being configured with the SUL based on the ordered Ci.

For example, when one octet with Ci fields is used for the PHR that is reported to the SgNB, the Ci fields may be used to indicate the presence of the PH per serving cell of the SCG and the PH related to the PCell may also be removed (e.g., based on the configurations or a set of predefined rules).

Figure 15:
FIG. 15 illustrates a ME PHR MAC configured to indicate that a triggered PHR is required for the OULs only, according to an exemplary implementation of the present application.

FIG. 15 illustrates a ME PHR MAC 1500 configured to indicate that a triggered PHR is required for the OULs only, according to an exemplary implementation of the present application. As shown in FIG. 15, when the triggered PHR is for the OUL only, the reserved bit R 1505 may be set to a predefined value, such as "0" in some of the present embodiments. In some such embodiments, the reserved bit R1 1512 (or R2 1514) may also be set to a predefined value, such as "0".

Figure 16:
FIG. 16 illustrates a ME PHR MAC configured to indicate that a triggered PHR is required for the SULs only, according to an exemplary implementation of the present application.

FIG. 16 illustrates a ME PHR MAC 1600 configured to indicate that a triggered PHR is required for the SULs only, according to an exemplary implementation of the present application. As shown in FIG. 16, when the triggered PHR is for the SUL only, the reserved bit R 1605 may be set to a different predefined value, such as "1" in some of the present embodiments. In some such embodiments, when the gNB receives the PHR MAC CE 1600 having its reserved bit R 1605 set to "1", the gNB may consider the PHR as a PHR that includes the PHs of the PSCell and the configured SUL(s). The gNB may further need to check the values of the reserved bits R1 1612 (or R2 1614) in order to determine whether a corresponding PH of the SUL associated with the serving cell follows or not. In some embodiments, the reserved bit R1 1612 (or R2 1614) may be set to a predefined value, such as "0".

The value of the PCMAX,c associated with the PH of the OUL carrier may be the same as, or different from, the value of the PCMAX,c associated with the PH of the SUL carrier of the same serving cell in different embodiments. For example, in some embodiments, the value of the PCMAX,c associated with the PH of the OUL carrier and the value of the PCMAX,c associated with the PH of the SUL carrier of the same serving cell may be the same, and equal to the configured UE transmitted power of the serving cell. In some other embodiments, the value of the PCMAX,c associated with the PH of the SUL carrier of the serving cell may be the configured UE transmitted power of the SUL carrier. The gNB may signal the two different values via an RRC message and may reconfigure the values dynamically.

In some aspects of the present embodiments, two LCIDs may be used to report the PH of the SUL(s) in the PHR MAC CE. For example, in some such embodiments, one LCID with one octet Ci and another LCID with 4 octets Ci, may be used to report the PHs of the SULs. In some aspects of the present embodiments, two LCIDs may be used to report the PH of the OUL(s) in the PHR MAC CE. For example, in some aspects of the present embodiments, one LCID with one octet Ci and another LCID with 4 octets Ci may be used to report the PHs of the OULs.

Figure 17:
FIG. 17 illustrates a ME PHR MAC configured to indicate that a triggered PHR is required for both of the OUL and the SUL, according to an exemplary implementation of the present application.

FIG. 17 illustrates a ME PHR MAC 1700 configured to indicate that a triggered PHR is required for both of the OUL and the SUL, according to an exemplary implementation of the present application. As shown in FIG. 17, in some of the present embodiments, when a PHR is required for both of the OUL and the SUL, the UE may set the reserved bit R 1705 to a predefined value (e.g., 0), and also set the R1 1712 to a predefined value (e.g., 1) to indicate that there is a PH of the SUL 1720 associated with the serving cell 1710 that follows the PH of the OUL of the serving cell 1710.

As before, the value of the PCMAX,c associated with the PH of the OUL carrier and the value of the PCMAX,c associated with the PH of the SUL carrier of the same serving cell may be the same or different in different embodiments. For example, in some embodiments, the value of the PCMAX,c associated with the PH of the OUL carrier and the value of the PCMAX,c associated with the PH of the SUL carrier of the same serving cell may be the same, which is the same as the configured UE transmitted power of the serving cell. In some other embodiments, the value of the PCMAX,c associated with the PH of the OUL carrier may be the configured UE transmitted power of the serving cell, while the value of the PCMAX,c associated with the PH of the SUL carrier of the same serving cell may be the configured UE transmitted power of the SUL carrier. The gNB may signal the two different values via an RRC message and may reconfigure the values dynamically.

In some of the present embodiments, even when an SUL is configured for a serving cell, the inclusion of the values of the PH and the PCMAX,c associated with the PH of the OUL carrier (or the SUL) in the PHR, may depend on the SRS configurations, or the allocated resources for the UL data transmission. For example, the value of the PH and the value of the PCMAX,c associated with the PH of the OUL carrier of a serving cell may be included in the PHR, when the serving cell indicated the corresponding UL data transmission or the configured SRS of OUL carrier. On the other hand, the value of the P1 and the value of the PCMAX,c associated with the PH of the SUL carrier of a serving cell may be included in the PHR when the serving cell indicated the corresponding UL data transmission or the configured SRS of the SULcarrier.

For example, in a scenario that the serving cell 1 in the PHR only uses the OUL for the UL data transmission, and the serving cell 2 only uses the SUL for the UL data transmission, and the serving cell 3 has configured SRS for both OUL and SUL, the reserved bit R1 (or R2) for the serving cells 1 and 2 may be set to a predefined value (e.g., 0). However, for the serving cell 3, since both PHs for the OUL and the SUL are reported, the reserved bit R1 (or R2) of the OUL may be set to a different predefined value (e.g., 1), and a corresponding PH of the SUL associated the serving cell may follow. It should be noted that the reserved bit R3 may be set to "0" in some embodiments.

The value of the PCMAX,c associated with the PH of the OUL carrier and the value of the PCMAX,c associated with the PH of the SUL carrier of the same serving cell may be the same or different in different embodiments. For example, the value of the PCMAX,c associated with the PH of the OUL carrier and the value of the PCMAX,c associated with the PH of the SUL carrier of the same serving cell may be the same, which is the configured UE transmitted power of the serving cell in some embodiments. In some other embodiments, the value of the PCMAX,c associated with the PH of the OUL carrier and the value of the PCMAX,c associated with the PH of the SUL carrier of the same serving may be different. For example, the value of the PCMAX,c associated with the PH of the OUL carrier of a serving cell may be the configured UE transmitted power of the serving cell, while the value of the PCMAX,c associated with the PH of the SUL carrier of the same serving cell may be the configured UE transmitted power of the SUL carrier. The gNB may signal the two different values via an RRC message and may reconfigure the values dynamically. In some of the present embodiments, the same mechanism may be applied to aPHR MAC CE that includes different octets with Ci fields.

For SUL configurations, the LTE UL and the NR SUL or UL may share the same frequency. Therefore, a Time Division Multiplexing (TDM) coordination between the MN and the SN in a dual connectivity case may be necessary. As such, the eNB may need to know whether the gNB has configured the SUL. On the other hand, the eNB may rely on the Operations, Administration, and Maintenance (OAM), since the eNB always needs to share the UL carrier with the gNBs that is under its coverage. In some embodiments, the eNB may reserve certain UL resources for the gNB's usage of the SUL in advance in order to support the UL coverage extension.

In some of the present embodiments, if the network side is required to be aware of whether an SUL carrier is configured for a serving cell of a UE or not, a signaling via X2/Xn interface may be required. This is because the MeNB is not assumed to comprehend the SgNB's configuration. For example, when a configured SUL carrier is the same as the one UL carrier used by the eNB, the coordination for UL carrier sharing between MN (e.g., MeNB in EN-DC case) and SN (e.g., SgNB in EN-DC case) may be required to void interference.

Figure 18A:
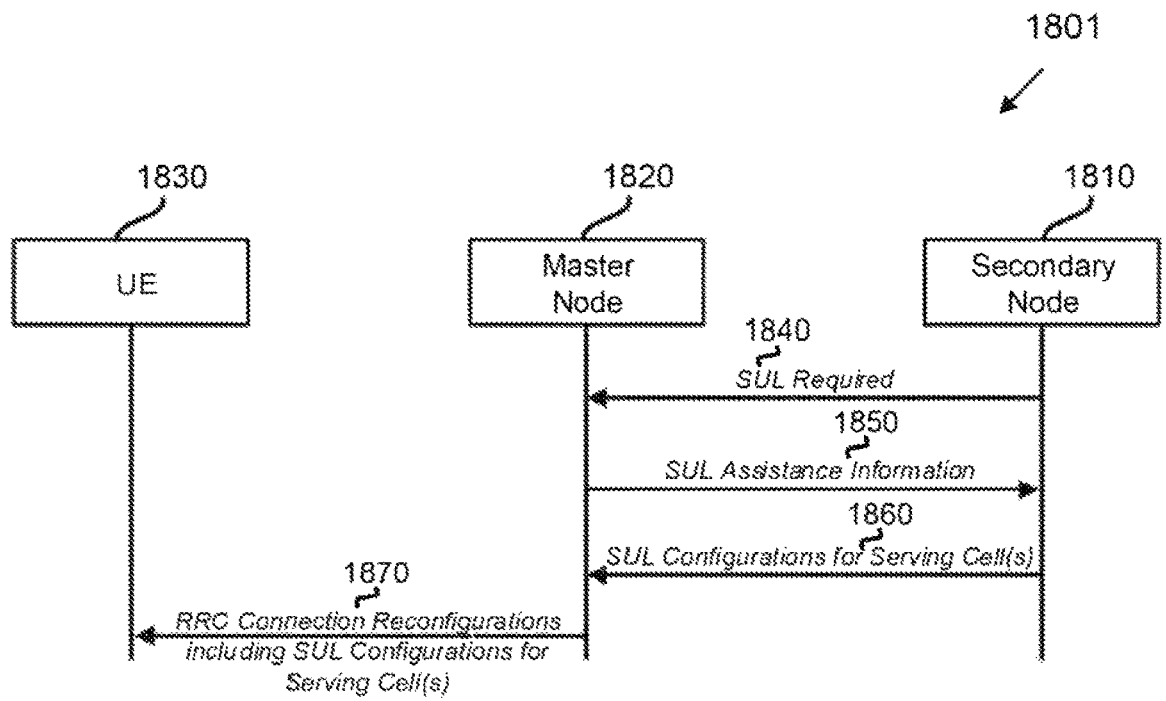
FIG. 18A is a diagram illustrating an SN successfully configuring a UE through an MN, according to some implementations of the present embodiments.
Figure 18B:
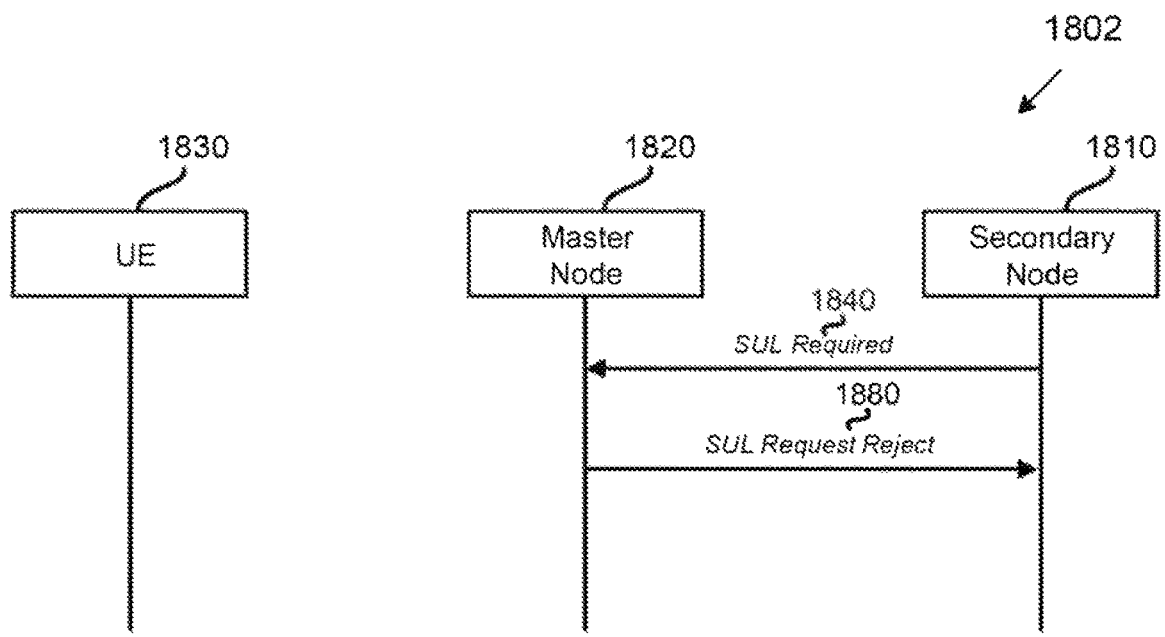
FIG. 18B is a diagram illustrating the SN getting rejected by the MN in configuring the UE, according to some implementations of the present embodiments.

FIGS. 18A and 18B illustrate a secondary node configuring supplemental uplink(s) for a UE. Specifically, FIG. 18A is a diagram illustrating an SN successfully configuring a UE through an MN, according to some implementations of the present embodiments. FIG. 18B, on the other hand, is a diagram illustrating the SN getting rejected by the MN in configuring the UE, according to some implementations of the present embodiments.

As shown in FIG. 18A, in some of the present embodiments, when the SN 1810 is required to configure the SUL(s) for the UE 1830, the SN 1810 may send an SUL Required message 1840 to the MN 1820. After receiving the SUL Required message 1840, the MN 1820 may respond the SUL Assistance Information 1850 to the SN 1810. The SUL Assistance Information 1850 may contain the Absolute Radio Frequency Channel Number (ARFCN) of the SUL carrier(s), the corresponding bandwidth, or the corresponding TDM pattern(s) used in the SUL carrier(s) in some aspects of the present embodiments.

Based on the SUL Assistance Information 1850, the SN 1810 may generate the SUL configurations for the serving cell(s) 1850 and send the generated configurations to the MN 1820. In some of the present embodiments, the MN 1820 may include the SUL configurations for the serving cell(s) in an RRC connection configuration 1870 and send the RRC connection configuration 1870 to the UE 1830. In some embodiments, if Signaling Radio Bearers 3 (SRB3) is configured for the network, the SN 1810 may directly transmit the SUL configurations for serving cell(s) to the UE 1830. As FIG. 18B shows, in some embodiment, after receiving the SUL Required message 1840, the MN 1820, however, may reject the SN 1810 and may transmit an SUL Request Reject message 1880 back to the SN 1810.

Figure 19A:
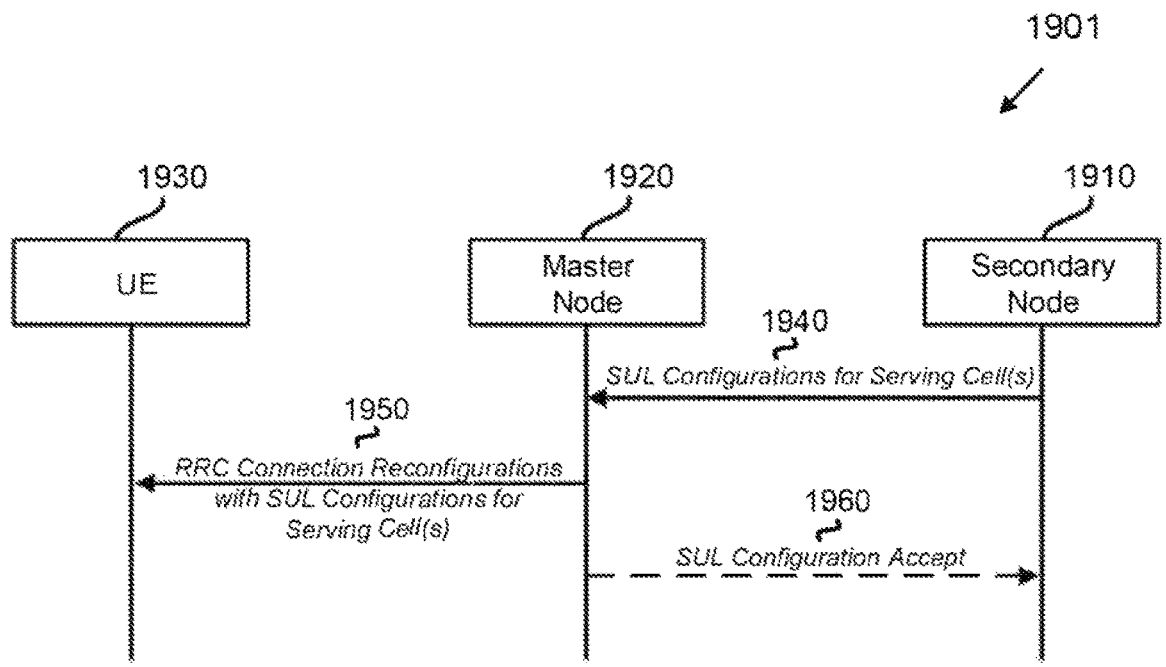
FIG. 19A is a diagram illustrating an SN successfully configuring a UE through an MN, according to some implementations of the present embodiments.
Figure 19B:
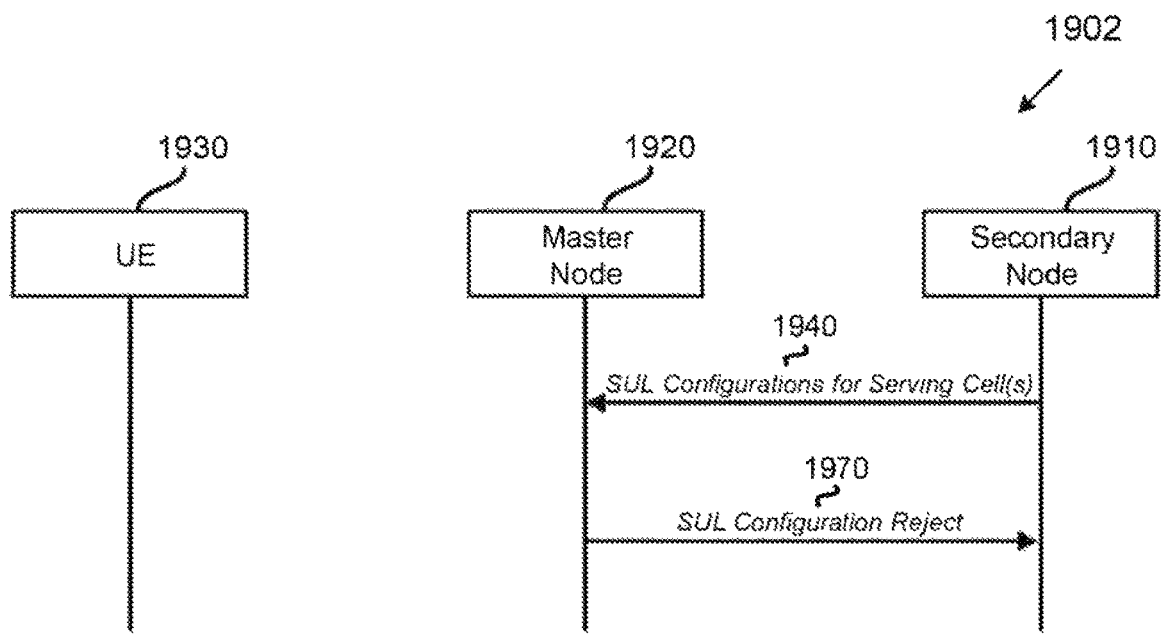
FIG. 19B, on the other hand, is a diagram illustrating the SN getting rejected by the MN in configuring the UE, according to some implementations of the present embodiments.

FIGS. 19A and 19B illustrate a secondary node configuring a UE with the supplemental uplinks for the serving cells in a secondary cell group. Specifically, FIG. 19A is a diagram illustrating an SN successfully configuring a UE through an MN, according to some implementations of the present embodiments. FIG. 19B, on the other hand, is a diagram illustrating the SN getting rejected by the MN in configuring the UE, according to some implementations of the present embodiments.

In some of the present embodiments, a secondary node may want to configure the UE with the SUL configurations for the serving cells in an SCG (e.g., according to the TDM coordination information, or the UL carrier overload, or some exchanging information among base stations). As shown in the figure, the SN 1910 may transmit the SUL configurations in a container of the X2/Xn message 1940. The X2/Xn message 1940 may also include the SUL notification and/or the SUL information (e.g., the ARFCN of the SUL carrier(s), the corresponding bandwidth, or the corresponding TMD pattern(s) used in the SUL carrier(s)).

If the MN 1920 accepts the SUL configurations from the SN 1910, in some of the present embodiments, the MN 1920 may transmit an RRC Connection Reconfiguration message 1950 to the UE 1930. The RRC Connection Reconfiguration message 1950 in some embodiments may include the SUL configurations generated by the SN 1910. In some of the present embodiments, the MN 1920 may acknowledge the acceptance of the SUL configurations by sending an SUL Configurations Accept message 1960 to the SN 1910 and notifying the SN 1910 that the SUL configurations are accepted.

In some of the present embodiments, the MN 1920 may reject the SUL configurations generated by the SN 1910. As shown in FIG. 19B, when the MN 1920 may reject the SUL configurations, the MN 1920 may send an SUL Configuration Reject message 1970 to the SN 1910 to notify the SN 1910 that the SUL configurations are rejected. In some of the present embodiments, the SUL Configurations Reject message 1970 may include, but is not limited to, the acceptable ARFCN of the SUL carrier(s), the corresponding bandwidth, the corresponding TMD pattern(s), etc. The SN 1910 may use the information included in the SUL Configurations Reject message 1970 to reconfigure the SUL configurations for the UE 1930.

In some of the present embodiments, the SN 1910 may not be allowed to transmit any SUL configuration to the MN 1920 without notifying the MN 1920 in advance. That is, the SN 1910 may always need to send the SUL configurations through the MN 1920 to the UE 1930. In some of the present embodiments, if the SN configures an SUL carrier for a serving cell in an SCG via SRB3, the SN may inform the MN of which SUL carrier is configured and if the one UL carrier is also used by the MN, a coordination mechanism may be required (e.g., the UL carrier load may be too heavy to be configured as an SUL).

Figure 20A:
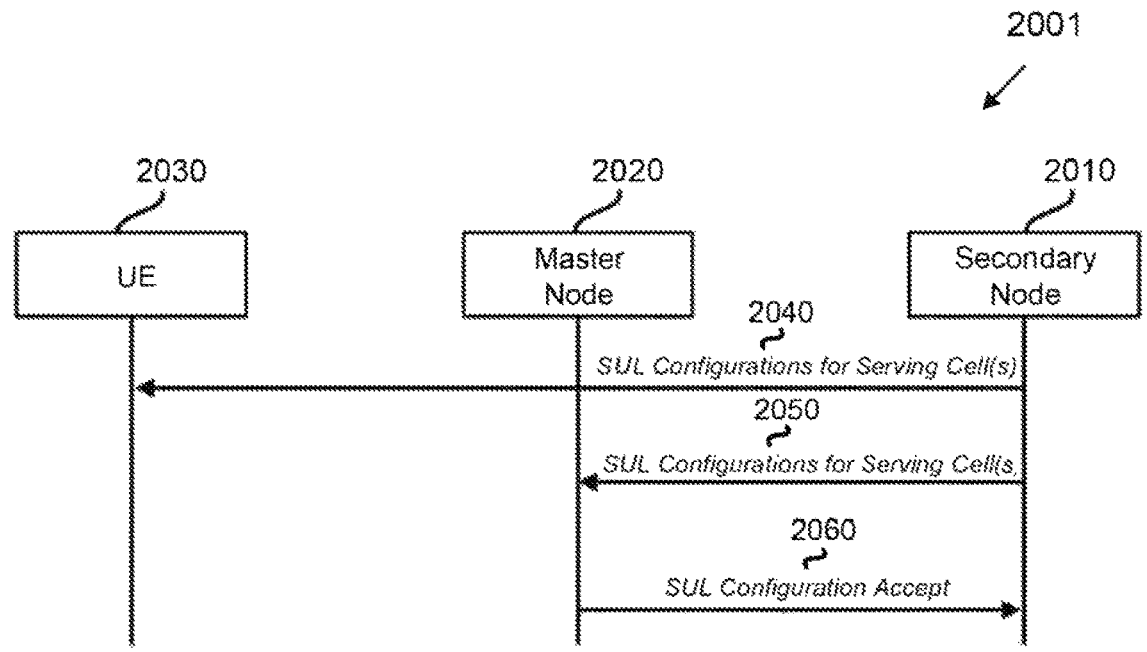
FIG. 20A is a diagram illustrating an SN successfully configuring a UE with the supplemental uplinks' configurations, according to some implementations of the present embodiments.
Figure 20B:
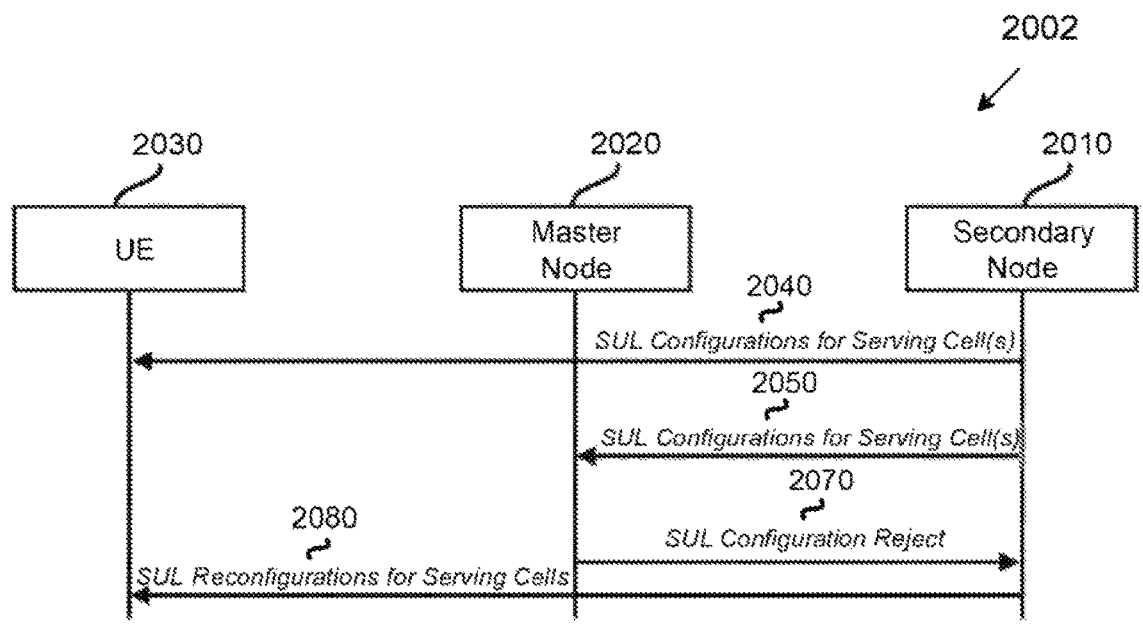
FIG. 20B is a diagram illustrating the SN getting rejected by the MN in configuring the UE with the supplemental uplinks' configurations, according to some implementations of the present embodiments.

FIGS. 20A and 20B illustrate a secondary node configuring a UE with the supplemental uplinks configurations and notifying a master node of the same. Specifically, FIG. 20A is a diagram illustrating an SN successfully configuring a UE with the supplemental uplinks' configurations, according to some implementations of the present embodiments. FIG. 20B, on the other hand, is a diagram illustrating the SN getting rejected by the MN in configuring the UE with the supplemental uplinks' configurations, according to some implementations of the present embodiments.

As shown in FIG. 20A, in some of the present embodiments, the SN 2010 may transmit the SUL configurations (for serving cells) 2040 to the UE 2030 directly. In some such embodiments, the SN 2010 may also inform the MN 2020 sending the configuration information directly to the UE 2030 by sending the SUL configuration in a container of the X2/Xn message 2050. In some of the present embodiments, the X2/Xn message 2050 may also include the SUL notification and/or the SUL information (e.g., ARFCN of the SUL carrier(s), the corresponding bandwidth, or the corresponding TMD pattern(s) used in the SUL carrier(s)).

In some of the present embodiments, after the MN 2020 accepts the SUL configuration from the SN 2010, the MN 2020 may send an SUL Configurations Accept message 2060 back to the SN 2010 to acknowledge the acceptance of the configuration information. The MN 2020 may also reject the configuration information from the SN 2010. FIG. 20B shows that, in some of the present embodiments, if the MN 2020 does not accept the SUL configurations information generated by the SN 2010, the MN 2020 may send an SUL Configuration Reject message 2070 back to the SN 2010 to notify the SN 2010 of rejection of the SUL configurations.

In some of the present embodiments, the SUL Configurations Reject message 2070 may include the acceptable ARFCN of the SUL carrier(s), the corresponding bandwidth, the corresponding TMD pattern(s), etc. The SN 2010 may use the received information in the SUL Configurations Reject message 2070 to generate the SUL Reconfiguration information 2080 and send the generated SUL Reconfiguration information to the UE 2030 again. Alternatively, after receiving the SUL Configurations Reject message 2070, the SN 2010 may forgo generating the reconfiguration information and simply delete the SUL configurations for the UE 2030.

Figure 21A:
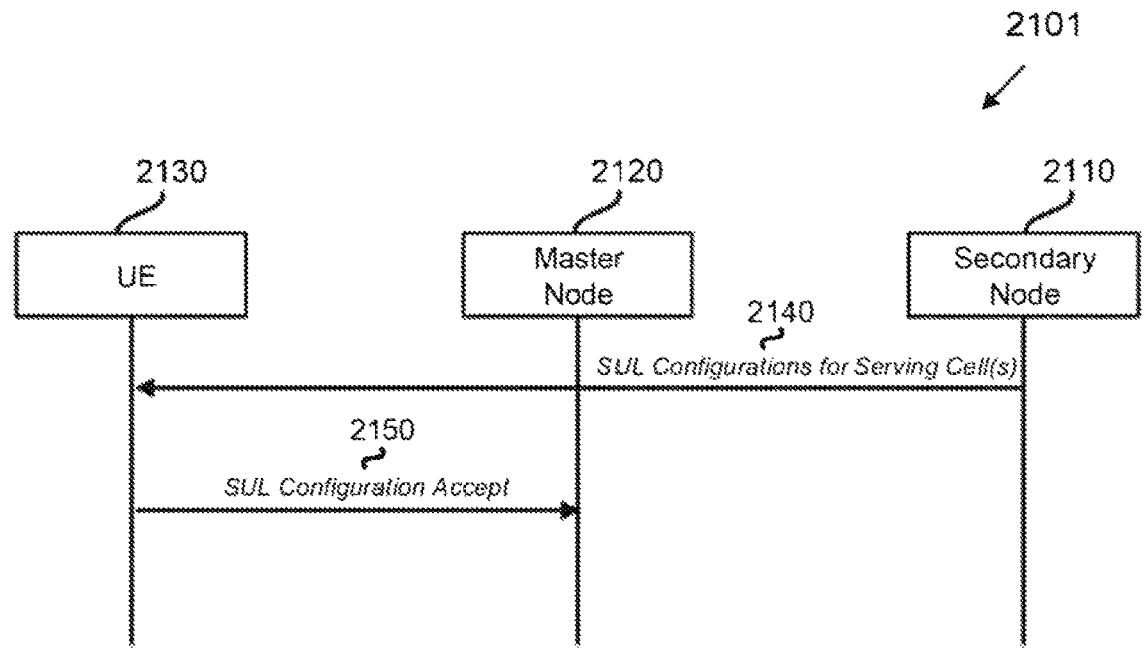
FIG. 21A is a diagram illustrating an SN successfully configuring a UE with the supplemental uplinks' configurations, according to some implementations of the present embodiments.
Figure 21B:
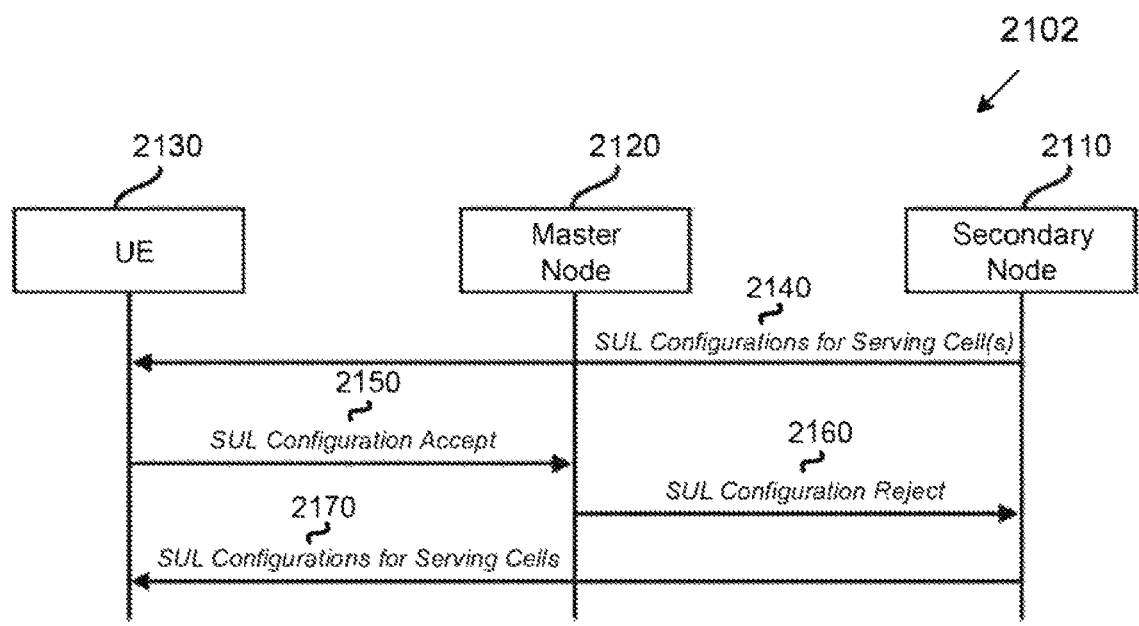
FIG. 21B is a diagram illustrating the SN getting rejected by the MN in configuring the UE with the supplemental uplinks' configurations, according to some implementations of the present embodiments.

FIGS. 21A and 21B illustrate a secondary node configuring a UE with the supplemental uplinks configurations and the UE notifying a master node of the same. Specifically, FIG. 21A is a diagram illustrating an SN successfully configuring a UE with the supplemental uplinks' configurations, according to some implementations of the present embodiments. FIG. 21B, on the other hand, is a diagram illustrating the SN getting rejected by the MN in configuring the UE with the supplemental uplinks' configurations, according to some implementations of the present embodiments.

In some of the present embodiments, if an SN configures an SUL carrier for a serving cell in the SCG via SRB3 (e.g., according to the TDM coordination information or the UL carrier overload or some exchanging information among base stations), the UE may inform the MN of the associated SUL carrier information.

FIG. 21A shows that the SN 2110 the SUL Configuration information 2140 directly to the UE 2130. In response to receiving the SUL configurations, the UE 2130 may inform the MN 2120 of the associated SUL carrier information by sending the SUL Configuration Notification 2150. If the configured SUL carrier is also the UL carrier used by the MeNB, a coordination mechanism may be required (e.g., the UL carrier load may be too heavy to be configured as an SUL).

In some of the present embodiments, if the SN 2110 configures an SUL carrier for a serving cell in SCG via SRB3 and the UE 2130 informs the MN 2120 of the associated SUL carrier information, the MN 2120 may not accept the SUL configurations generated by the SN 2110. The MN may then send an SUL Configuration Reject message 2160, as shown in FIG. 21B, to the SN 2110 to notify the SN 2110 of the rejection of the SUL configurations. The SUL Configurations Reject message 2160, may include, but is not limited to, the acceptable ARFCN of the SUL carrier(s), the corresponding bandwidth, the corresponding TMD pattern(s), etc. The SN 2110 may user the received information to reconfigure the SUL configurations and send the SUL Reconfigurations 2170 one more time to the UE 2130, or alternatively, the SN 2110 may delete the SUL configurations for the UE 2130.

In some of the present embodiments, if the SN configures an SUL carrier for a serving cell in the SCG via SRB3, and the UE informs the MN of the associated SUL carrier information, the MN may not accept the SUL configurations generated by the SN. Then, the MN may feedback the SUL Configuration Reject message to the UE. In the SUL Configurations Reject message, the acceptable ARFCN of the SUL carrier(s), the corresponding bandwidth, or the corresponding TMD pattern(s) may be included. The UE may then inform the SN that the SUL configuration is rejected by the MN and may also include the information in the SUL Configuration Reject message. The SN may then reconfigure the SUL configurations, or delete the SUL configurations for the UE.

Figure 22:
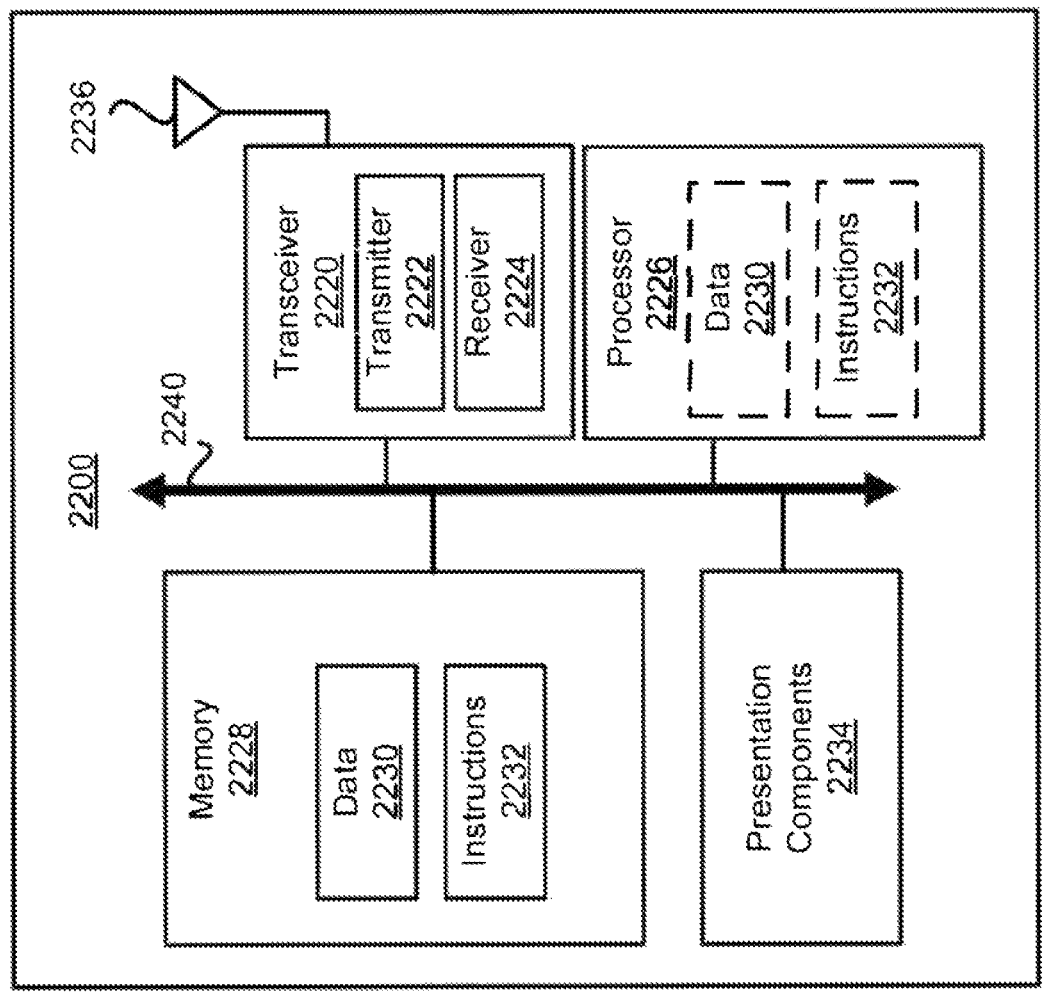
FIG. 22 illustrates a block diagram of a node for wireless communication, in accordance with various aspects of the present application.

FIG. 22 illustrates a block diagram of a node for wireless communication, in accordance with various aspects of the present application. As shown in FIG. 22, node 2200 may include transceiver 2220, processor 2226, memory 2228, one or more presentation components 2234, and at least one antenna 2236. Node 2200 may also include an RF spectrum band module, a base station communications module, a network communications module, and a system communications management module, input/output (I/O) ports, I/O components, and power supply (not explicitly shown in FIG. 22). Each of these components may be in communication with each other, directly or indirectly, over one or more buses 2240.

Transceiver 2220 having transmitter 2222 and receiver 2224 may be configured to transmit and/or receive time and/or frequency resource partitioning information. In some implementations, transceiver 2220 may be configured to transmit in different types of subframes and slots including, but not limited to, usable, non-usable and flexibly usable subframes and slot formats. Transceiver 2220 may be configured to receive data and control channels.

Node 2200 may include a variety of computer-readable media. Computer-readable media can be any available media that can be accessed by node 2200 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2228 may include computer-storage media in the form of volatile and/or non-volatile memory. Memory 2228 may be removable, non-removable, or a combination thereof. Exemplary memory includes solid-state memory, hard drives, optical-disc drives, and etc. As illustrated in FIG. 22, memory 2228 may store computer-readable, computer-executable instructions 2232 (e.g., software codes) that are configured to, when executed, cause processor 2226 to perform various functions described herein, for example, with reference to FIGS. 1 through 21B. Alternatively, instructions 2232 may not be directly executable by processor 2226 but be configured to cause node 2200 (e.g., when compiled and executed) to perform various functions described herein.

Processor 2226 may include an intelligent hardware device, e.g., a central processing unit (CPU), a microcontroller, an ASIC, and etc. Processor 2226 may include memory. Processor 2226 may process data 2230 and instructions 2232 received from memory 2228, and information through transceiver 2220, the base band communications module, and/or the network communications module. Processor 2226 may also process information to be sent to transceiver 2220 for transmission through antenna 2236, to the network communications module for transmission to a core network.

One or more presentation components 2234 presents data indications to a person or other device. Exemplary one or more presentation components 2234 include a display device, speaker, printing component, vibrating component, and etc.

In a first aspect of the present application, a method for reporting power headroom by a user equipment (UE) to an evolved NodeB (eNB) in a Multi-Radio Access Technology (RAT)-Dual Connectivity (MR-DC) scenario is disclosed, the method comprising: generating, by the UE, a DC Power Headroom Report (PHR) Medium Access Control (MAC) Control Element (CE) having a fixed number of octets with cell index fields for indicating whether a power headroom (PH) for a serving cell with a corresponding cell index is reported; and transmitting, by the UE, the DC PHR MAC CE to the eNB, wherein the fixed number of octets is independent of a highest secondary Cell Index (SCellIndex) for serving cells with configured uplink.

In an implementation of the first aspect, the fixed number of octets is four for the DC PHR MAC CE.

In another implementation of the first aspect, a logic channel identifier (LCID) identifies the DC PHR MAC CE for both single-octet bitmap with cell index fields and four-octet bitmap with cell index fields.

In yet another implementation of the first aspect, the DC PHR MAC CE is identified by a MAC PDU subheader including at least one of: an LCID for reporting the DC PHR MAC CE using a single-octet bitmap; or an LCID for reporting the DC PHR MAC CE using a four-octet bitmap.

In yet another implementation of the first aspect, the DC PHR MAC CE is identified by a MAC PDU subheader with an LCID for reporting the DC PHR MAC CE using a four-octet bitmap when the eNB is a secondary node.

In yet another implementation of the first aspect, when the eNB is a secondary node, the DC PHR MAC CE is identified by a MAC PDU subheader including at least one of: an LCID for reporting the DC PHR MAC CE using a one-octet bitmap; or an LCID for reporting the DC PH R MAC CE using a four-octet bitmap.

In a second aspect of the present application, a user equipment (UE) configured to report power headroom to an evolved NodeB (eNB) in a Multi-Radio Access Technology (RAT)—Dual Connectivity (MR-DC) scenario is disclosed, the UE comprising: one or more non-transitory computer-readable media having computer-executable instructions embodied thereon; and at least one processor coupled to the one or more non-transitory computer-readable media, and configured to execute the computer-executable instructions to: generate a DC Power Headroom Report (PHR) Medium Access Control (MAC) Control Element (CE) having a fixed number of octets with cell index fields for indicating whether a power headroom (PH) for a serving cell with a corresponding cell index is reported; and transmit the DC PHR MAC CE to the eNB, wherein the fixed number of octets is independent of a highest secondary Cell Index (SCellIndex) for serving cells with configured uplink.

In an implementation of the second aspect, the fixed number of octets is four for the DC PHR MAC CE.

In another implementation of the second aspect, a logic channel identifier (LCID) identifies the DC PHR MAC CE for both single-octet bitmap with cell index fields and four-octet bitmap with cell index fields.

In yet another implementation of the second aspect, the DC PHR MAC CE is identified by a MAC PDU subheader including at least one of: an LCID for reporting the DC PHR MAC CE using a single-octet bitmap; or an LCID for reporting the DC PHR MAC CE using a four-octet bitmap.

In yet another implementation of the second aspect, the DC PHR MAC CE is identified by a MAC PDU subheader with an LCID for reporting the DC PHR MAC CE using a four-octet bitmap when the eNB is a secondary node.

In yet another implementation of the second aspect, when the eNB is a secondary node, the DC PHR MAC CE is identified by a MAC PUD subheader including at least one of: an LCD for reporting the DC PHR MAC CE using a one-octet bitmap; or an LCID for reporting the DC PHR MAC CE using a four-octet bitmap.

In a third aspect of the present application, a method for reporting power headroom by a user equipment (UE) to a next generation NodeB (gNB) in a Multi-Radio Access Technology (RAT)—Dual Connectivity (MR-DC) scenario is disclosed, the method comprising: generating a Multiple Entry (ME) Power Headroom Report (PHR) MAC Control Element (CE) based on information received from a network, the ME PHR MAC CE having a fixed number of octets with cell index fields for indicating whether a power headroom (PH) for a serving cell with a corresponding cell index is reported, wherein the fixed number of octets is determined based on information received from a network; and transmitting, by the UE, the ME PHR MAC CE to the gNB.

In an implementation of the third aspect, the information received from the network comprises one of a highest serving cell index (ServCellIndex) for serving cells with configured uplink, and a stop value of a secondary node serving cell index range.

In another implementation of the third aspect, a bit in the ME PHR MAC CE is used to indicate whether a PH of a supplemental uplink (SUL) associated with a serving cell is present in the ME PHR MAC CE, and wherein the SUL is supplemental to an original uplink (OUL) associated with the serving cell.

In yet another implementation of the third aspect, whether the PH of the SUL associated with the serving cell is present, is based on at least one of: one or more sounding reference signal (SRS) configurations for the SUL associated with the serving cell; or one or more allocated resources for uplink data transmission on the SUL associated with the serving cell.

In yet another implementation of the third aspect, a bit in the ME PHR MAC CE is used to indicate whether one or more original uplink (OUL) PHs of serving cells are reported or one or more supplemental uplink (SUL) PHs of serving cells are reported.

In yet another implementation of the third aspect, the ME PHR MAC CE is identified by a MAC PDU subheader including at least one of: an LCID for reporting the ME PHR MAC CE for one or more supplemental uplinks (SULs) using a single-octet bitmap; or an LCID for reporting the ME PHR MAC CE for one or more SULs using a four-octet bitmap.

In a forth aspect of the present application, user equipment (UE) configured to report power headroom to a next generation NodeB (gNB) in a Multi-Radio Access Technology (RAT)—Dual Connectivity (MR-DC) scenario is disclosed, the UE comprising: one or more non-transitory computer-readable media having computer-executable instructions embodied thereon; and at least one processor coupled to the one or more non-transitory computer-readable media, and configured to execute the computer-executable instructions to: generate a Multiple Entry (ME) Power Headroom Report (PHR) MAC Control Element (CE) based on information received from a network, the ME PHR MAC CE having a fixed number of octets with cell index fields for indicating whether a power headroom (PH) for a serving cell with a corresponding cell index is reported, wherein the fixed number of octets is determined based on information received from a network; and transmit the ME PHR MAC CE to the gNB.

In an implementation of the fourth aspect, the information received from the network comprises one of a highest serving cell index (ServCellIndex) for serving cells with configured uplink, and a stop value of a secondary node serving cell index range.

In another implementation of the fourth aspect, a bit in the ME PHR MAC CE is used to indicate whether a PH of a supplemental uplink (SUL) associated with a serving cell is present in the ME PH R MAC CE, and wherein the SUL is supplemental to an original uplink (OUL) associated with the serving cell.

In yet another implementation of the fourth aspect, whether the PH of the SUL associated with the serving cell is present, is based on at least one of: one or more sounding reference signal (SRS) configurations for the SUL associated with the serving cell; or one or more allocated resources for uplink data transmission on the SUL associated with the serving cell.

In yet another implementation of the fourth aspect, a bit in the ME PHR MAC CE is used to indicate whether one or more original uplink (OUL) PHs of serving cells are reported or one or more supplemental uplink (SUL) PHs of serving cells are reported.

In yet another implementation of the fourth aspect, the ME PHR MAC CE is identified by a MAC PDU subheader including at least one of: an LCID for reporting the ME PHR MAC CE for one or more supplemental uplinks (SULs) using a single-octet bitmap; or an LCID for reporting the ME PHR MAC CE for one or more SULs using a four-octet bitmap.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method comprising:
    generating, by a user equipment, a power headroom report medium-access-control control-element having a format; and
    transmitting the power headroom report medium-access-control control-element to an evolved NodeB;
    wherein the power headroom report medium-access-control control-element is identified by a medium-access-control protocol data unit subheader, the medium-access-control protocol data unit subheader including:
        a first logical channel identifier configured to report the power headroom report medium-access-control control-element using a single-octet bitmap when a cell index corresponding to serving cells with configured uplinks is less than eight; and
        a second logical channel identifier configured to report the power headroom report medium-access-control control-element using a four-octet bitmap when the cell index is greater than or equal to eight,
    wherein the format comprises a fixed number of octets, wherein the fixed number of octets is independent of the cell index.

2. The method of claim 1, wherein the user equipment is configured to calculate a power headroom value using a threshold transmitted power value.

3. The method of claim 1, wherein the user equipment is configured to calculate a power headroom value using an estimated power value.

4. The method of claim 1, wherein the user equipment is configured to calculate a power headroom value responsive to at least one serving cell.

5. A user equipment comprising:
one or more non-transitory computer-readable media storing one or more computer-executable instructions; and
at least one processor coupled to the one or more non-transitory computer-readable media, and configured to execute the one or more computer-executable instructions to:
generate a power headroom report medium-access-control control-element having a format; and
transmit the power headroom report medium-access-control control-element to an evolved NodeB,
a first logical channel identifier corresponding to the power headroom report medium-access-control control-element, the first logical channel identifier using a single-octet bitmap when a cell index for serving cells with configured uplinks is less than eight, and
a second logical channel identifier corresponding to the power headroom report medium-access-control control-element, the second logical channel identifier using, a four-octet bitmap when the cell index is greater than or equal to eight,
wherein the format comprises a fixed number of octets, wherein the fixed number of octets is independent of the cell index.

6. The user equipment of claim 5, wherein the at least one processor is further configured to calculate a power headroom value using a maximum transmitted power value.

7. The user equipment of claim 5, wherein the at least one processor is further configured to calculate a power headroom value using an estimated power value.

8. The user equipment of claim 5, wherein the at least one processor is further configured to calculate a power headroom value responsive to at least one activated serving cell.

9. A method comprising:
generating, by a user equipment, a power headroom report medium-access-control control-element, the power headroom report medium-access-control control-element having a format; and
transmitting the power headroom report medium-access-control control-element to a next generation NodeB, wherein:
a single-octet bitmap is used for indicating presence of a power headroom per serving cell when a cell index of a serving cell with a configured uplink is less than eight,
a four-octet bitmap is used for indicating presence of a power headroom per serving cell when the cell index is equal to or greater than eight, and
the format comprises a fixed number of octets, wherein the fixed number of octets is independent of the cell index.

10. The method of claim 9, wherein the user equipment is configured to calculate a power headroom value using a maximum transmitted power value.

11. The method of claim 9, wherein the user equipment is configured to calculate a power headroom value using an estimated power value.

12. The method of claim 9, wherein the user equipment is configured to calculate a power headroom value responsive to at least one activated serving cell.

13. An apparatus comprising:
one or more non-transitory computer-readable media storing one or more computer-executable instructions; and
at least one processor coupled to the one or more non-transitory computer-readable media, and configured to execute the one or more computer-executable instructions to:
generate a first power headroom report medium-access-control control-element having a format; and
transmit a second power headroom report medium-access-control control-element to a next generation NodeB, wherein:
a first logical channel identifier is configured to report the first power headroom report medium-access-control control-element using a single-octet bitmap when a cell index for serving cells with configured uplinks is less than eight,
a second logical channel identifier is configured to report the first power headroom report medium-access-control control-element using a four-octet bitmap when the cell index is greater than or equal to eight,
the single-octet bitmap is further used for indicating presence of a power headroom per serving cell when the cell index is less than eight,
the four-octet bitmap is further used for indicating presence of a power headroom per serving cell when the cell index is not less than eight, and
the format comprises a fixed number of octets, wherein the fixed number of octets is independent of the cell index.

14. The apparatus of claim 13, wherein the at least one processor is further configured to calculate a power headroom value using a maximum transmitted power value.

15. The apparatus of claim 13, wherein the at least one processor is further configured to calculate a power headroom value using an estimated power value.

16. The apparatus of claim 13, wherein the at least one processor is further configured to calculate a power headroom value responsive to at least one activated serving cell.

* * * * *